(12) United States Patent     (10) Patent No.: US 8,902,180 B2
Laibowitz et al.     (45) Date of Patent: Dec. 2, 2014

(54) METHODS, APPARATUSES, AND COMPUTER PROGRAM PRODUCTS FOR ENABLING USE OF REMOTE DEVICES WITH PRE-DEFINED GESTURES

(75) Inventors: Mat Laibowitz, Los Angeles, CA (US); Vids Samanta, Los Angeles, CA (US); Joseph A. Paradiso, Medford, MA (US)

(73) Assignee: Nokia Corporation, Espoo (FI)

( * ) Notice: Subject to any disclaimer, the term of this patent is extended or adjusted under 35 U.S.C. 154(b) by 286 days.

(21) Appl. No.: 13/328,777

(22) Filed: Dec. 16, 2011

(65) Prior Publication Data

US 2013/0154915 A1     Jun. 20, 2013

(51) Int. Cl.
*G06F 3/041*     (2006.01)

(52) U.S. Cl.
USPC .......................................... 345/173; 345/156

(58) Field of Classification Search
USPC ................................. 345/156–184
See application file for complete search history.

(56) References Cited

U.S. PATENT DOCUMENTS

| | | | |
|---|---|---|---|
| 7,667,686 B2* | 2/2010 | Suh ............................... | 345/156 |
| 8,139,030 B2* | 3/2012 | Zhao et al. ..................... | 345/158 |
| 8,423,076 B2* | 4/2013 | Kim et al. ................... | 455/550.1 |
| 2005/0212753 A1 | 9/2005 | Marvit et al. | |
| 2007/0176820 A1 | 8/2007 | Vidal | |
| 2007/0176898 A1* | 8/2007 | Suh ............................... | 345/158 |
| 2008/0036743 A1* | 2/2008 | Westerman et al. .......... | 345/173 |
| 2009/0161027 A1 | 6/2009 | Hardacker et al. | |
| 2009/0197635 A1* | 8/2009 | Kim et al. ................... | 455/550.1 |
| 2009/0265627 A1* | 10/2009 | Kim et al. ...................... | 715/702 |
| 2010/0161084 A1* | 6/2010 | Zhao et al. ....................... | 700/85 |
| 2011/0058107 A1 | 3/2011 | Sun et al. | |
| 2011/0095873 A1* | 4/2011 | Pratt et al. ................... | 340/12.28 |
| 2011/0221623 A1* | 9/2011 | Yano et al. ..................... | 341/176 |
| 2012/0144299 A1* | 6/2012 | Patel et al. ..................... | 715/702 |
| 2012/0172126 A1* | 7/2012 | Padovani et al. ................ | 463/36 |
| 2012/0270654 A1* | 10/2012 | Padovani et al. ................ | 463/36 |
| 2013/0120280 A1* | 5/2013 | Kukulski ...................... | 345/173 |

FOREIGN PATENT DOCUMENTS

| | | |
|---|---|---|
| EP | 2 362 299 A1 | 8/2011 |
| WO | WO 2006/052347 A1 | 5/2006 |
| WO | WO 2011/053453 A1 | 5/2011 |

OTHER PUBLICATIONS

Boring, S. et al., *Scroll, Tilt or Move it: Using Mobile Phones to continuously control Pointers on Large Public Displays*, Proceedings ISBN (2009) 8 pages.
International Search Report and Written Opinion for Application No. PCT/FI2012/051241; dated Oct. 14, 2013.

(Continued)

*Primary Examiner* — Dmitriy Bolotin
(74) *Attorney, Agent, or Firm* — Alston & Bird LLP

(57) ABSTRACT

Methods, apparatuses, and computer program products are herein provided for enabling use of external devices with pre-defined gestures. A method may include receiving operation information from a remote device, wherein the operation information indicates at least one operation that may be invoked by the remote device. The method may further include associating, by a processor, at least one pre-defined gesture with the at least one operation. The method may further include receiving user input. The method may further include determining that the user input corresponds to the at least one pre-defined gesture. The method may further include causing transmission of indication information to the remote device, wherein the indication information provides an indication to the remote device to perform the at least one operation associated with the pre-defined gesture. Corresponding apparatuses and computer program products are also provided.

17 Claims, 17 Drawing Sheets

(56) References Cited

OTHER PUBLICATIONS

Ballagas, R., et al.; "*The Smart Phone: A Ubiquitous Input Device*;" IEEE Pervasive Computing, vol. 5, No. 1; pp. 70-77; dated Jan. 2006; retrieved on Aug. 15, 2013 from <www.idi.ntnu.no/grupper/su/bibliography/pdf/2006/Ballagas2006pc.pdf>.

Miyaoku, K., et al.; "*C-Blink: A Hue-Difference-Based Light Signal Marker for Large Screen Interaction via any Mobile Terminal*;" Proceedings of the 17th annual ACM symposium on User interface software and technology; pp. 147-156; dated 2004; abstract retrieved on Aug. 16, 2013 from <http://dl.acm.org/citation.cfm?id=1029657>.

Miyaoku, K., et al.; "*C-Blink: A Hue-Difference-Based Light Signal Marker via a Cell Phone Color Display*;" Internationa Journal of Human-Computer Interaction, vol. 23, No. 1-2; dated 2007; pp. 143-161; abstract retrieved on Aug. 16, 2013 from <http://www.tandfonline.com/doi/abs/10.1080/10447310701363106>.

Partial International Search Report for Application No. PCT/FI2012/051241; dated Jul. 29, 2013.

\* cited by examiner

METHODS, APPARATUSES, AND COMPUTER PROGRAM PRODUCTS FOR ENABLING USE OF REMOTE DEVICES WITH PRE-DEFINED GESTURES

TECHNOLOGICAL FIELD

Example embodiments of the present invention relate generally to user interface technology and, more particularly, relate to methods, apparatuses, and computer program products for enabling use of a remote device with pre-defined gestures, such as through use of a mobile computing device.

BACKGROUND

Interactive systems (e.g., ticket dispensers for public transportation, information kiosks for directions, etc.) have become increasingly available and useful to the public. Such systems are capable of performing a vast array of functionality, often being specialized for each particular system. Such variation, however, may cause the interactive public system to include functionality that is new and/or foreign to certain users. Therefore, it can be difficult for a new user to interact with such systems. Moreover, some interactive systems may purposefully limit their own functionality to provide for an easier interaction between new users and the interactive system.

Advancement in technology has also brought about a tremendous expansion of wireline and wireless networks, and with it personal mobile computing devices. The combination of the robust functionality and small form factor of these mobile computing devices enable users to carry their personal mobile computing devices nearly everywhere. These mobile computing devices have even begun to interact with the interactive public systems, but to date, this interaction has been limited and less than intuitive.

BRIEF SUMMARY

The popular nature of mobile computing devices have caused users to become proficient (and generally familiar) with their personal mobile computing device. This is contrary to many of the interactive public systems, which include varying and specific functionality.

Since users are familiar with their personal mobile computing devices, it may be useful for such mobile computing devices to aid in the user's interaction with these interactive public systems. In particular, a user, in some cases, may interact and utilize the entire functionality of the remote device. For example, the mobile computing device may match pre-defined gestures known by the mobile computing device with operations capable of being invoked by the remote device. The mobile computing device can then receive user input indicating a pre-defined gesture and, in response, notify the remote device to perform the corresponding operation. Such an invention offers the user a potentially more intuitive, more customizable, more personalized, and richer interactive experience with the remote device.

Embodiments of the present invention contemplate a user's mobile computing device learning a user's typical inputs over time. The mobile computing device could assign the learned (and personalized) user input to universal pre-defined gestures. These pre-defined gestures may act as a universal language, which can be associated with functionality of the interactive public systems, and thereby utilized by the mobile computing device to indicate to the interactive public system that certain functionality should be performed. Thus, embodiments of the present invention enable use of a remote device (e.g., an interactive public system) with the user's mobile computing device, and more particularly, with the pre-defined gestures trained for a specific user and recognizable by the mobile computing device.

As such, embodiments of the present invention provide methods, apparatuses, and computer program products for enabling use of external devices with pre-defined gestures. In one example embodiment, a method includes receiving operation information from a remote device, wherein the operation information indicates at least one operation that may be invoked by the remote device. The method further includes associating, by a processor, at least one pre-defined gesture with the at least one operation. The method further includes receiving user input. The method further includes determining that the user input corresponds to the at least one pre-defined gesture. The method further includes causing transmission of indication information to the remote device, wherein the indication information provides an indication to the remote device to perform the at least one operation associated with the pre-defined gesture.

In another example embodiment, an apparatus comprising at least one processor and at least one memory storing computer program code, wherein the at least one memory and stored computer program code are configured, with the at least one processor, to cause the apparatus to receive operation information from a remote device, wherein the operation information indicates at least one operation that may be invoked by the remote device. The at least one memory and stored computer program code are configured, with the at least one processor, to further cause the apparatus to associate at least one pre-defined gesture with the at least one operation. The at least one memory and stored computer program code are configured, with the at least one processor, to further cause the apparatus to receive user input. The at least one memory and stored computer program code are configured, with the at least one processor, to further cause the apparatus to determine that the user input corresponds to the at least one pre-defined gesture. The at least one memory and stored computer program code are configured, with the at least one processor, to further cause the apparatus to cause transmission of indication information to the remote device, wherein the indication information provides an indication to the remote device to perform the at least one operation associated with the pre-defined gesture.

In another example embodiment, a computer program product is provided. The computer program product of this example embodiment includes at least one computer-readable storage medium having computer-readable program instructions stored therein. The program instructions of this example embodiment comprise program instructions configured to cause an apparatus to perform a method comprising receiving operation information from a remote device, wherein the operation information indicates at least one operation that may be invoked by the remote device. The method further includes associating, by a processor, at least one pre-defined gesture with the at least one operation. The method further includes receiving user input. The method further includes determining that the user input corresponds to the at least one pre-defined gesture. The method further includes causing transmission of indication information to the remote device, wherein the indication information provides an indication to the remote device to perform the at least one operation associated with the pre-defined gesture.

In another example embodiment, an apparatus is provided. The apparatus comprises means for receiving operation information from a remote device, wherein the operation information indicates at least one operation that may be invoked by the remote device. The apparatus may further include a means for associating, by a processor, at least one pre-defined gesture with the at least one operation. The apparatus may further include a means for receiving user input. The apparatus may further include a means for determining that the user input corresponds to the at least one pre-defined gesture. The apparatus may further include a means for causing transmission of indication information to the remote device, wherein the indication information provides an indication to the remote device to perform the at least one operation associated with the pre-defined gesture.

BRIEF DESCRIPTION OF THE DRAWINGS

Figure 1:
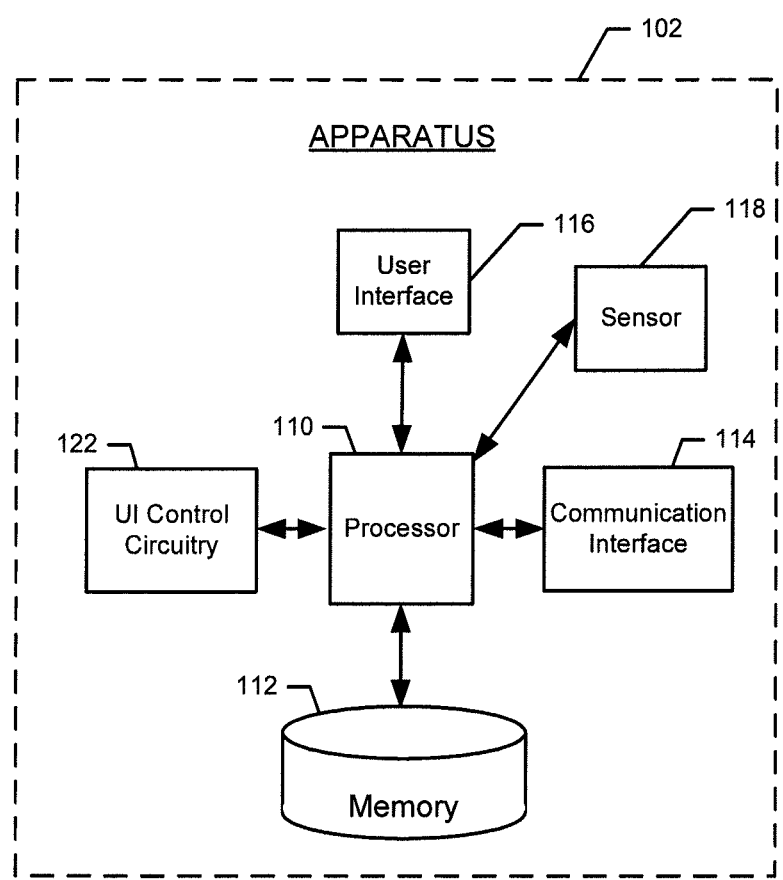
Figure 2:
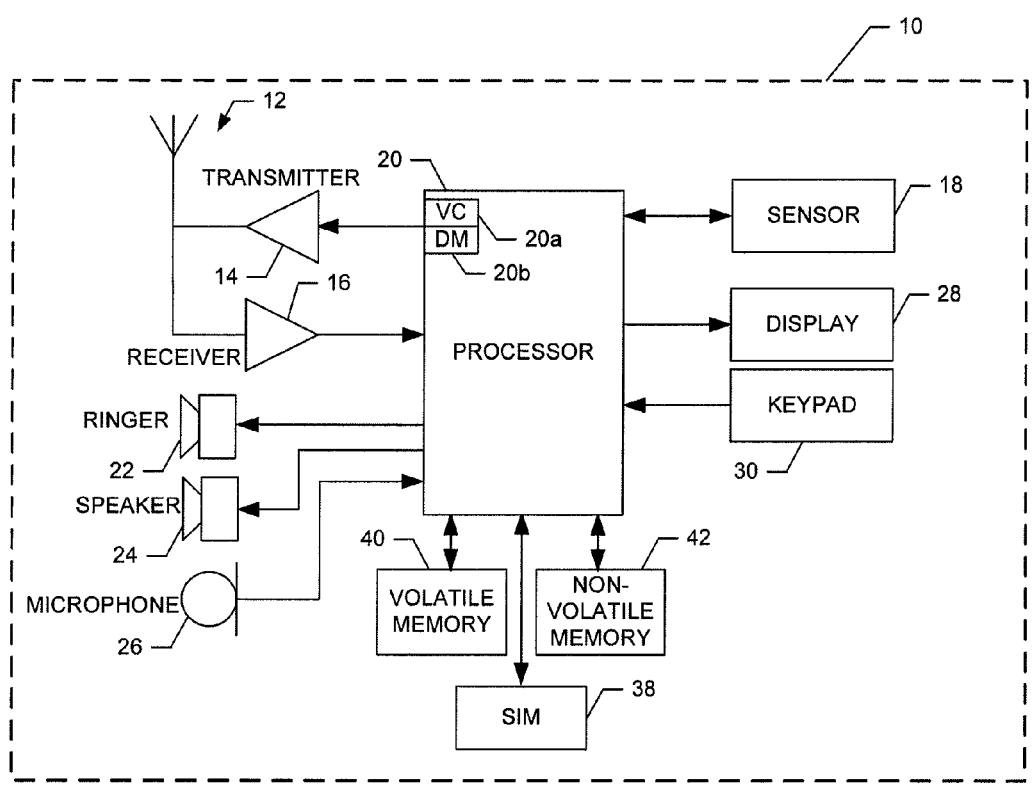
Figure 3A:
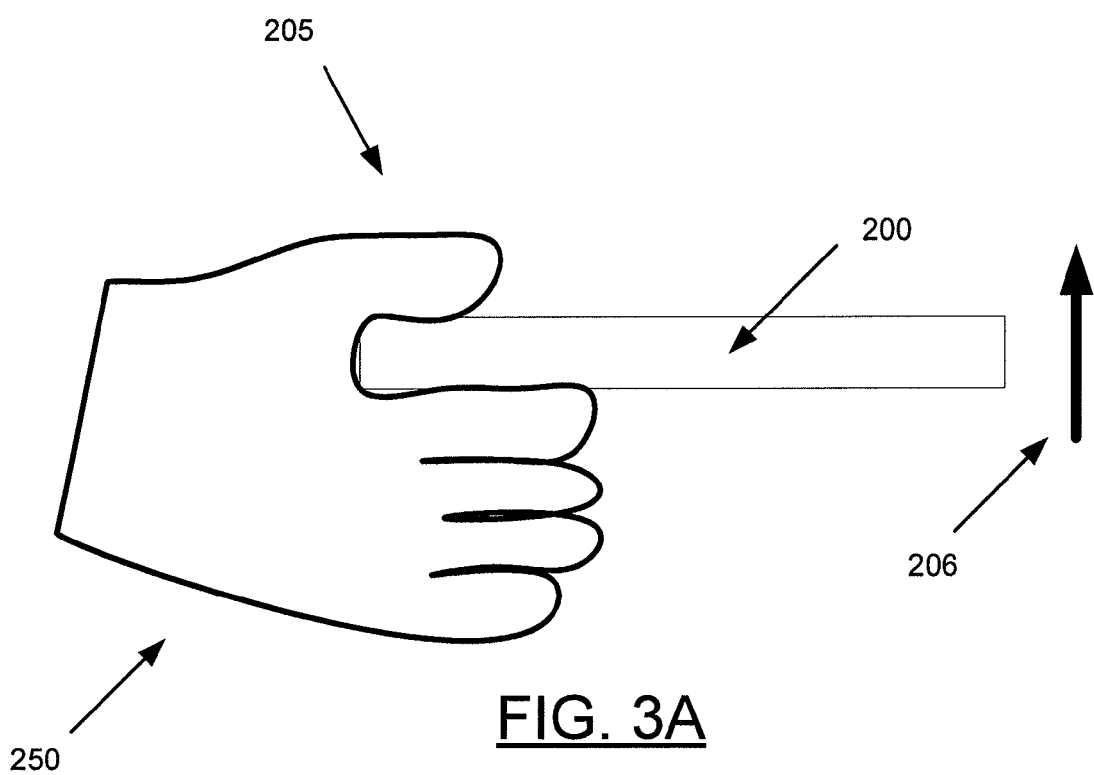
Figure 3B:
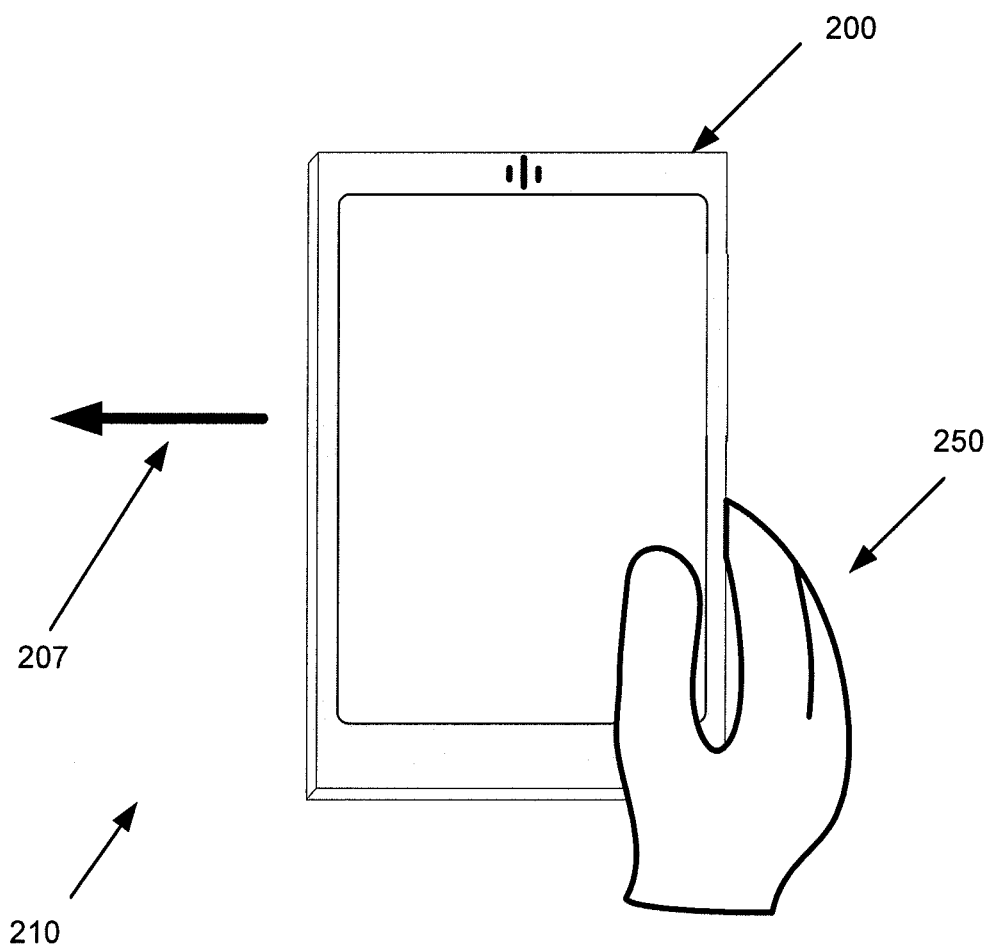
Figure 4:
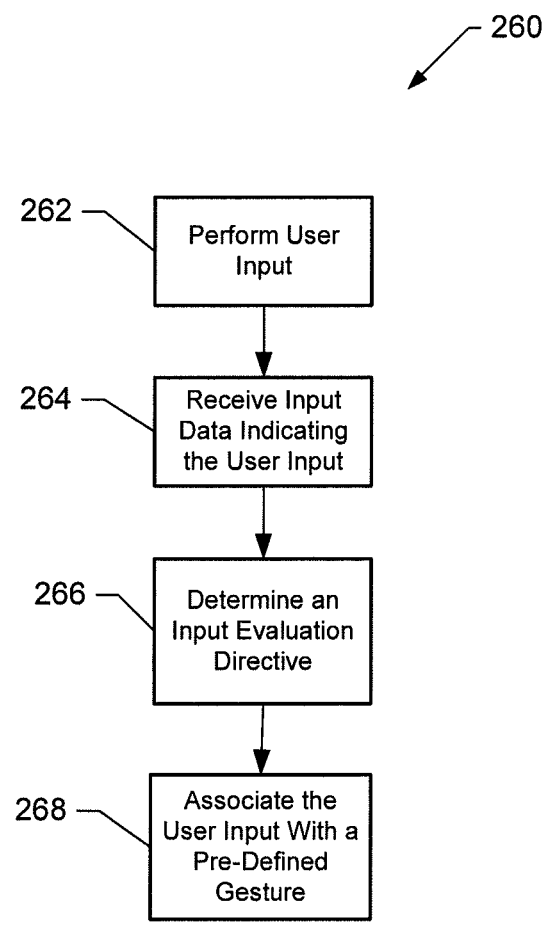
Figure 4A:
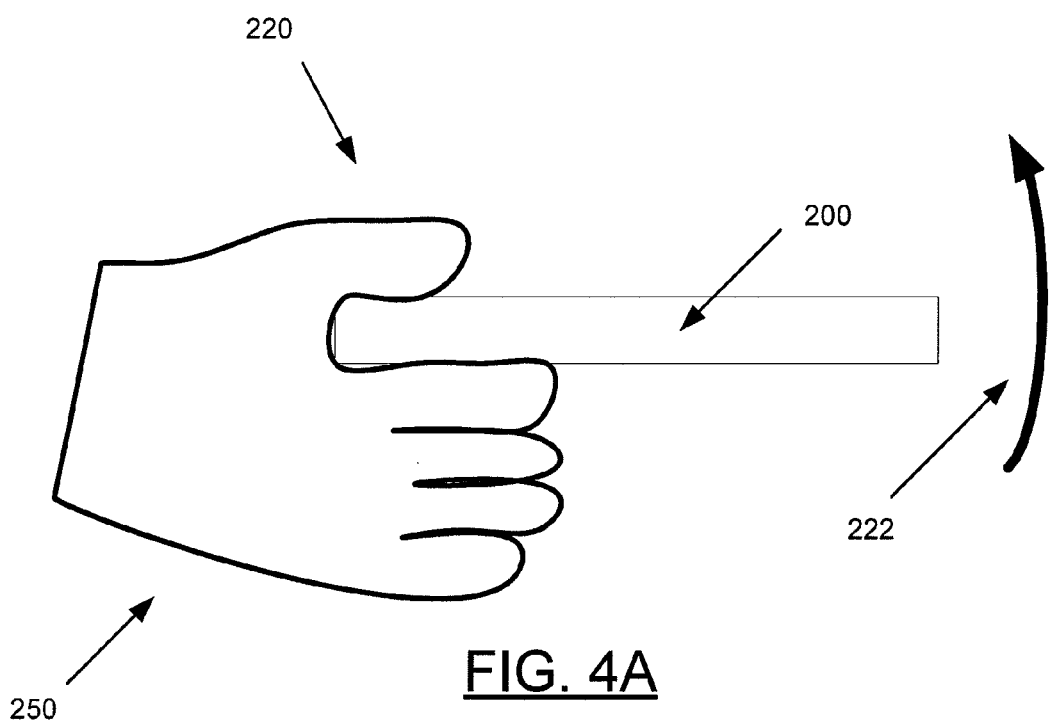
Figure 4B:
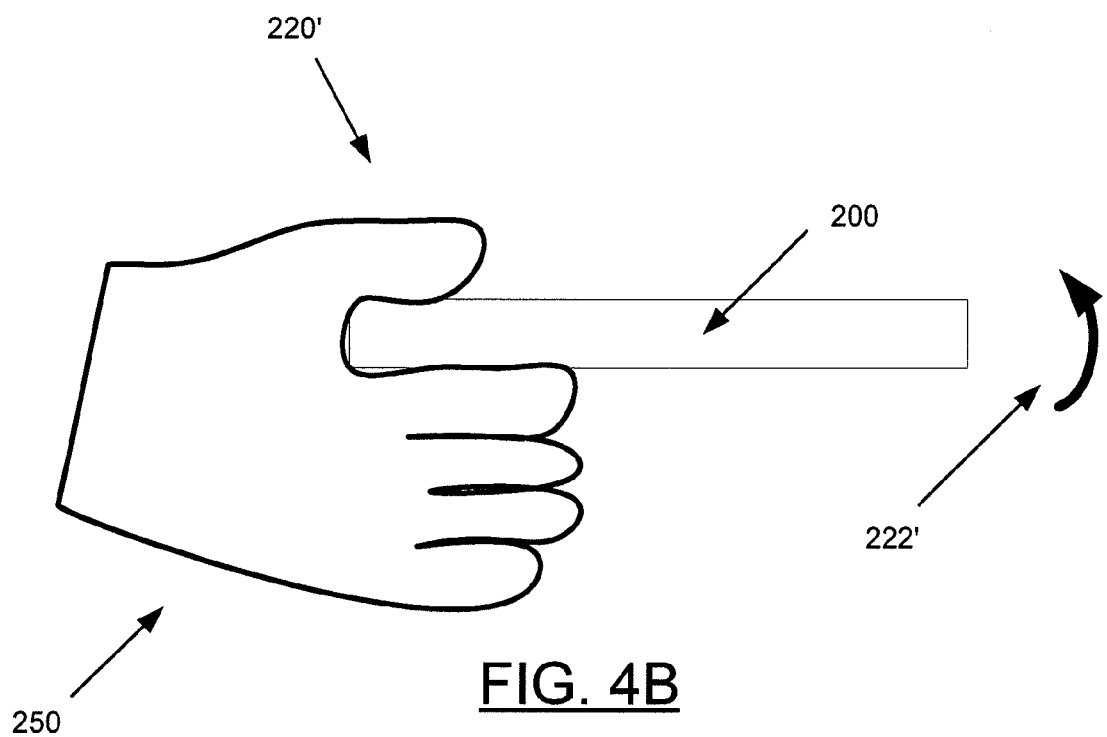
Figure 4C:
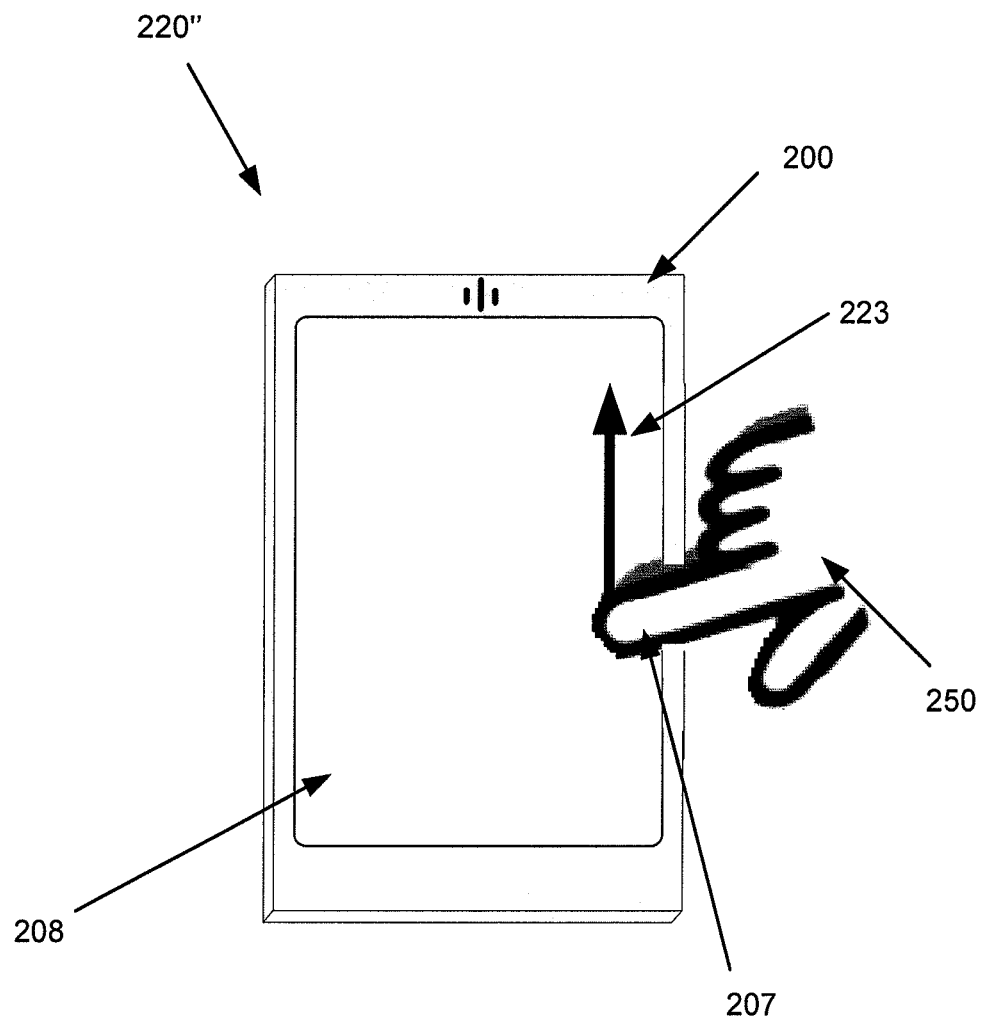
Figure 5:
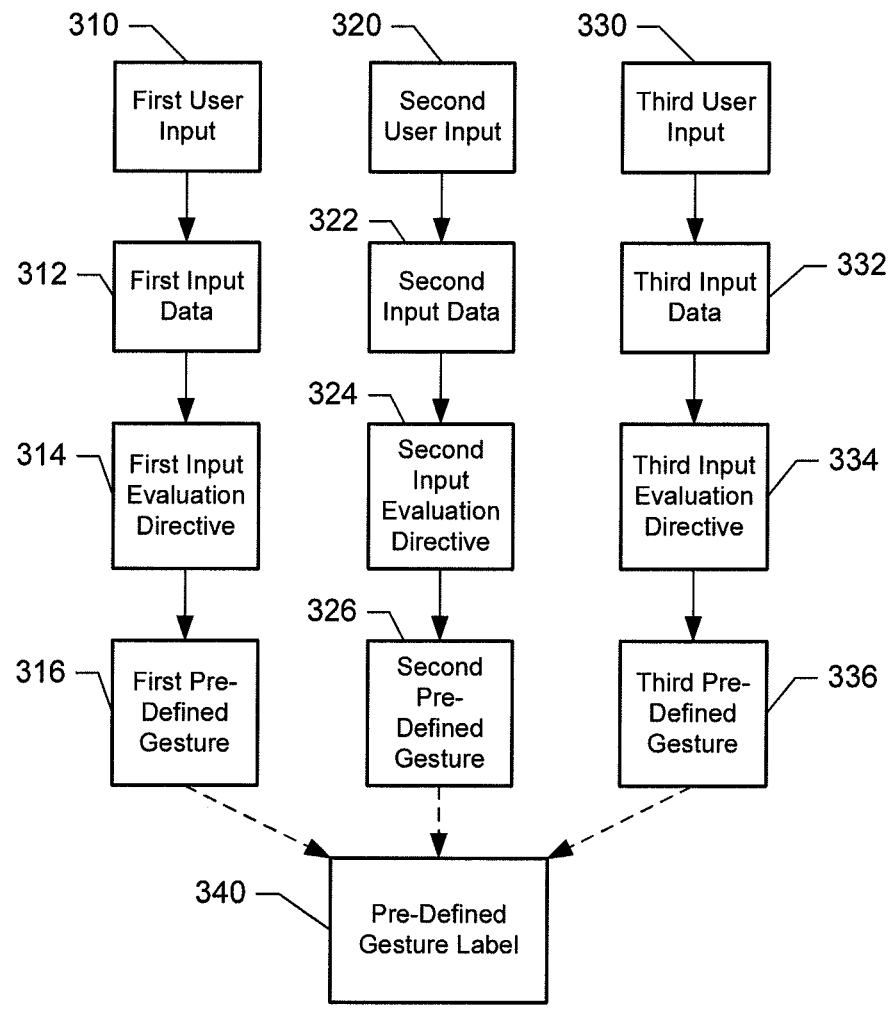
Figure 6:
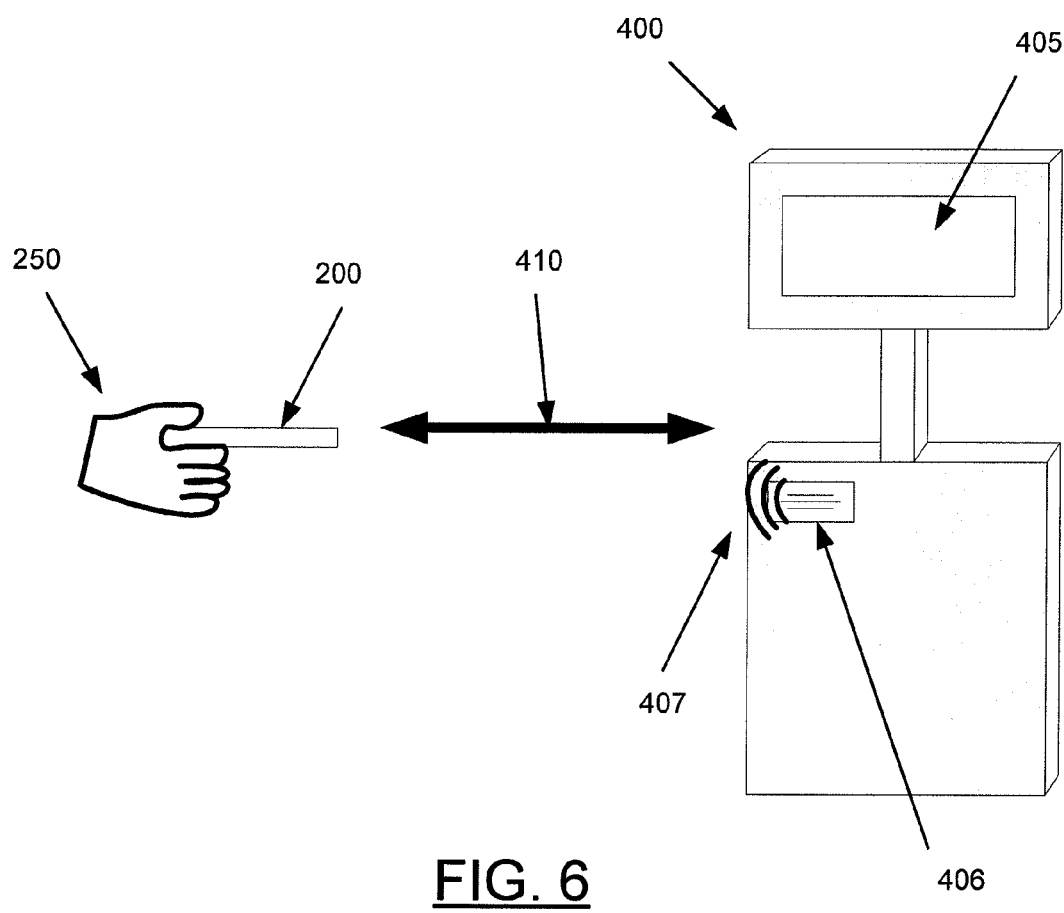
Figure 6A:
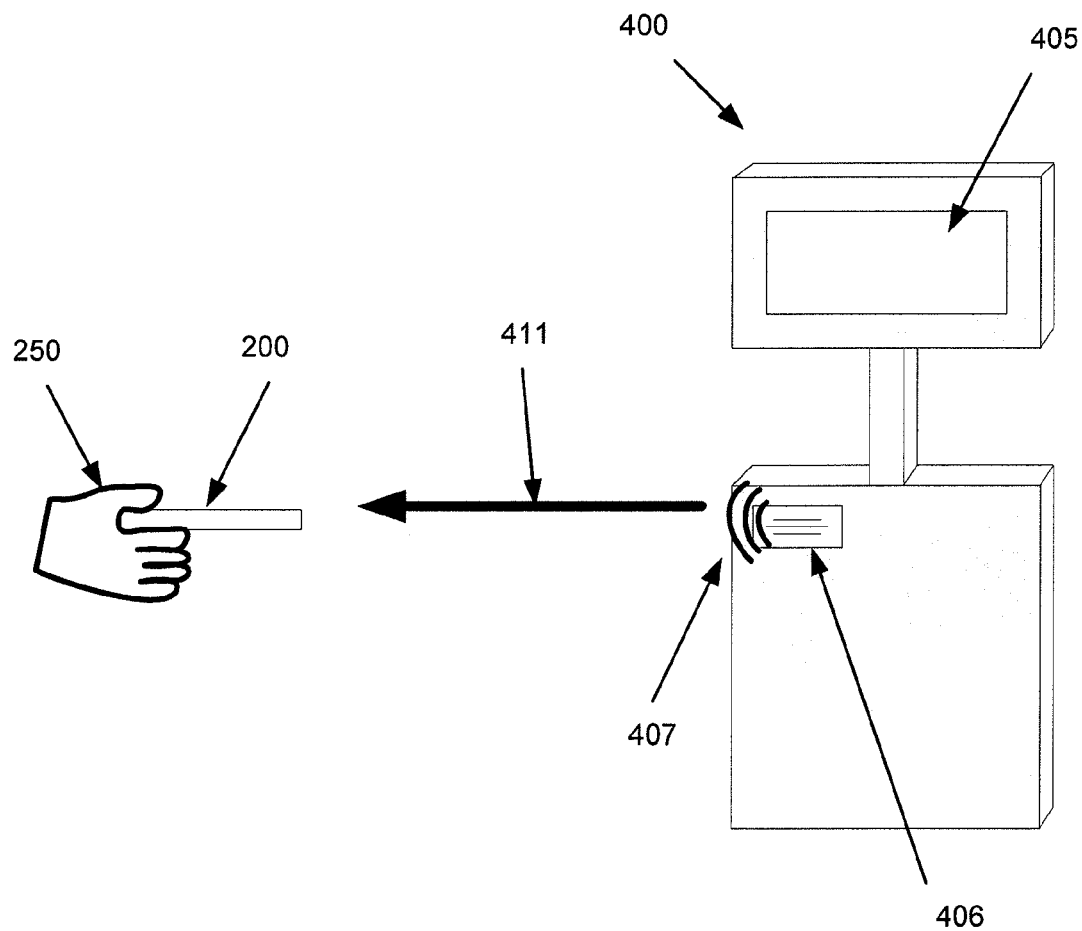
Figure 7:
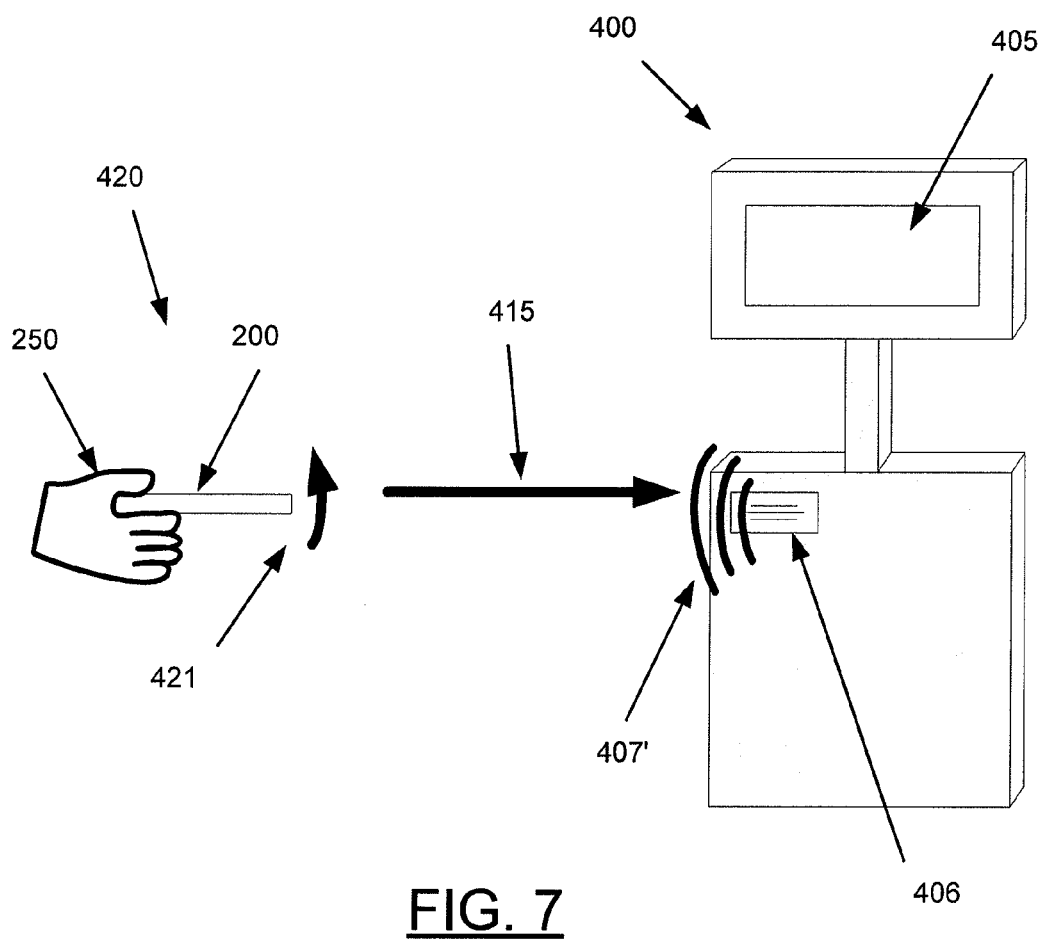
Figure 8:
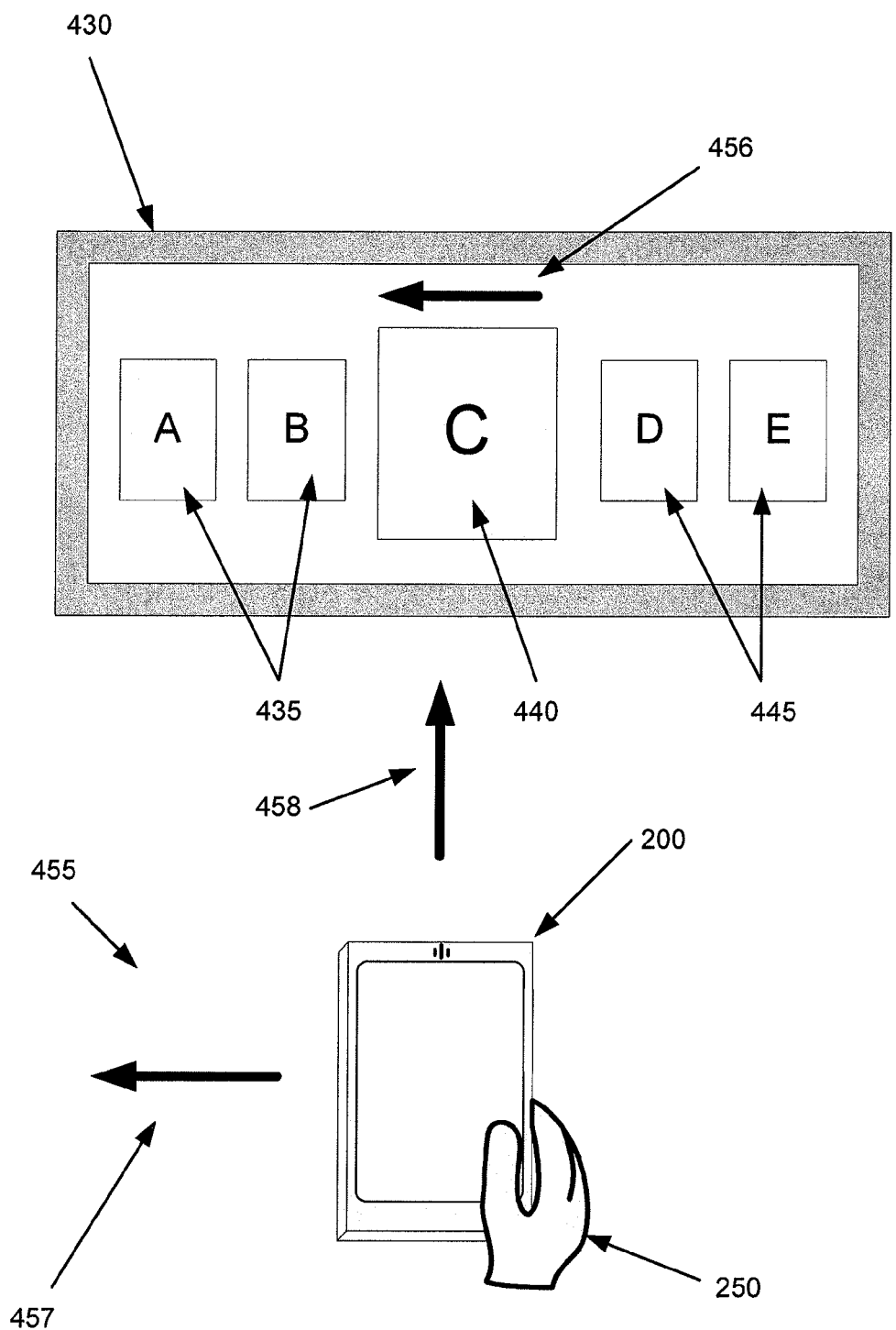
Figure 8A:
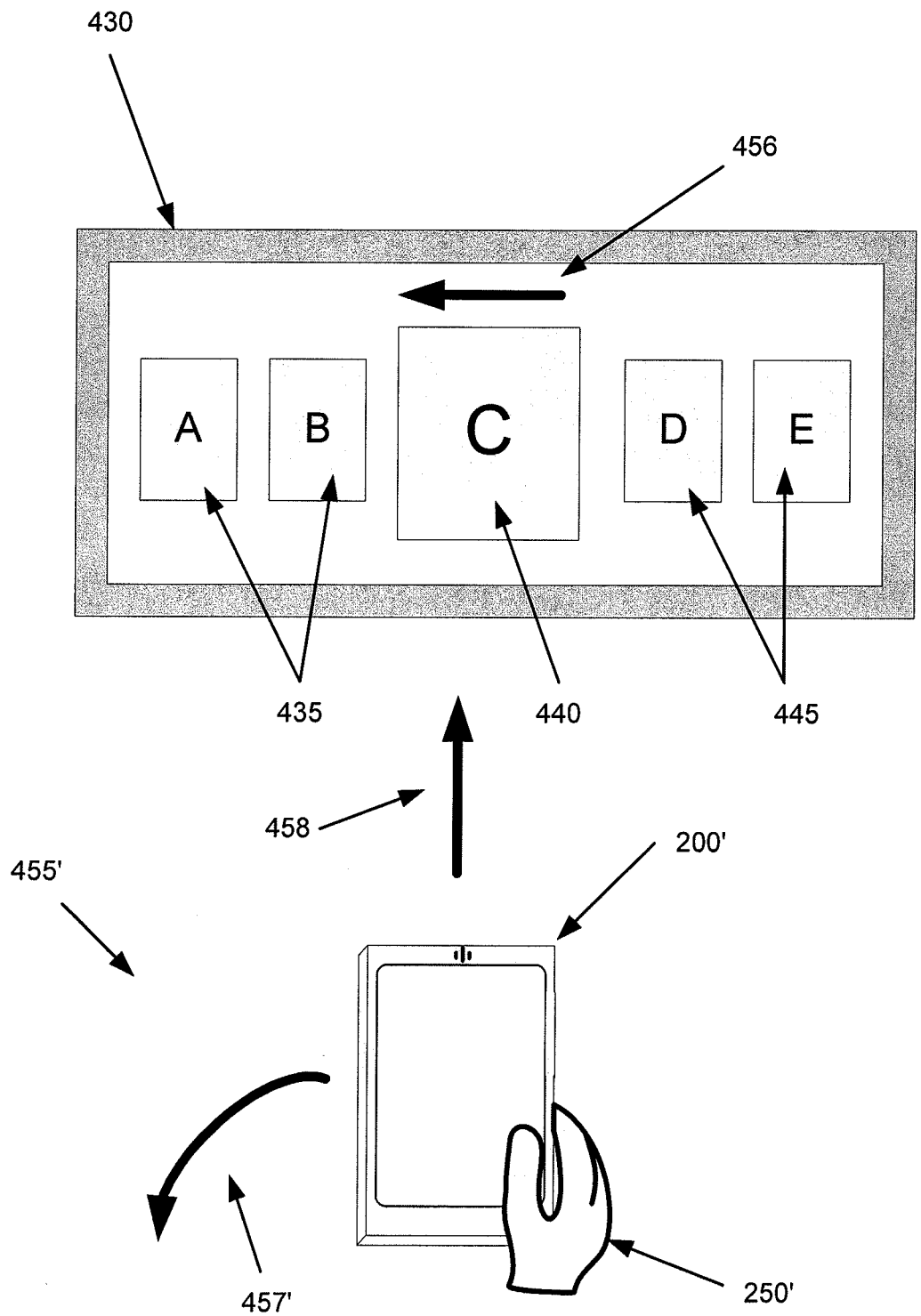
Figure 9:
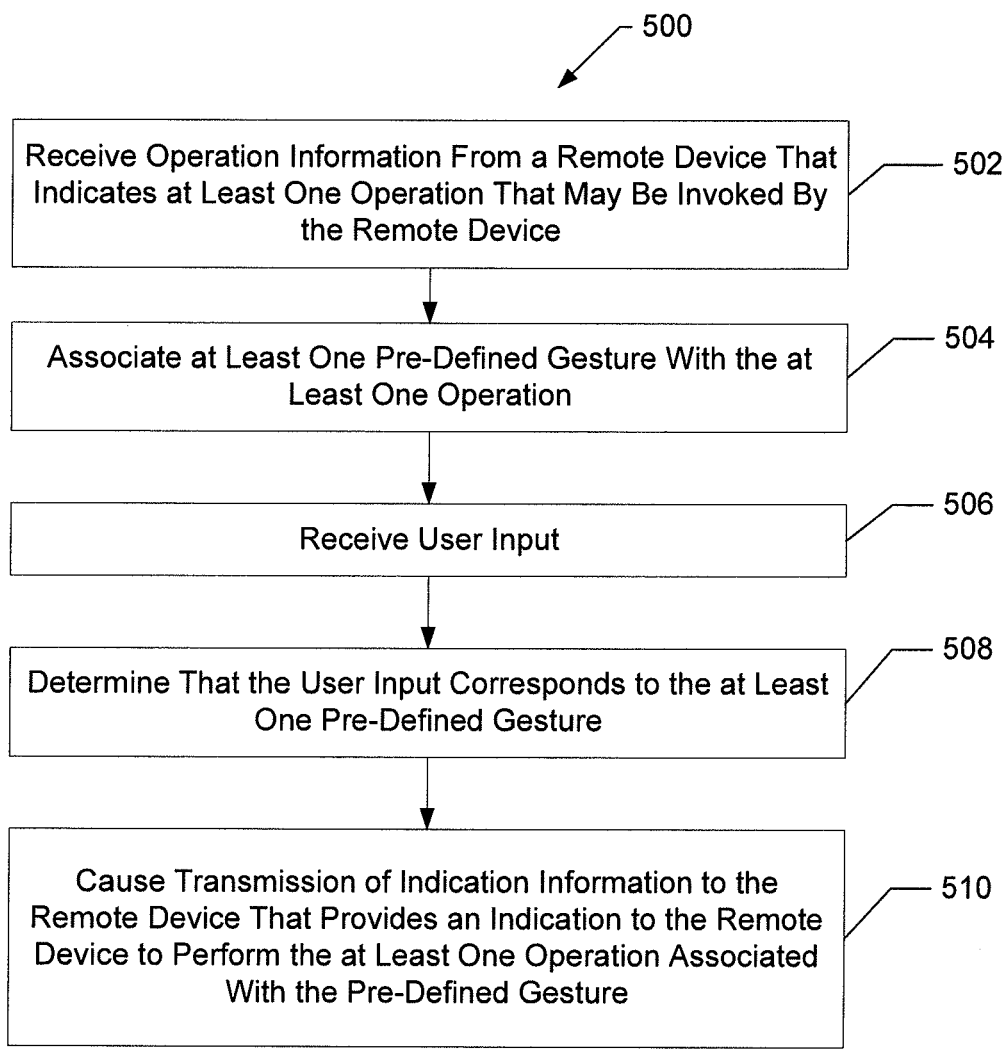
Figure 10:
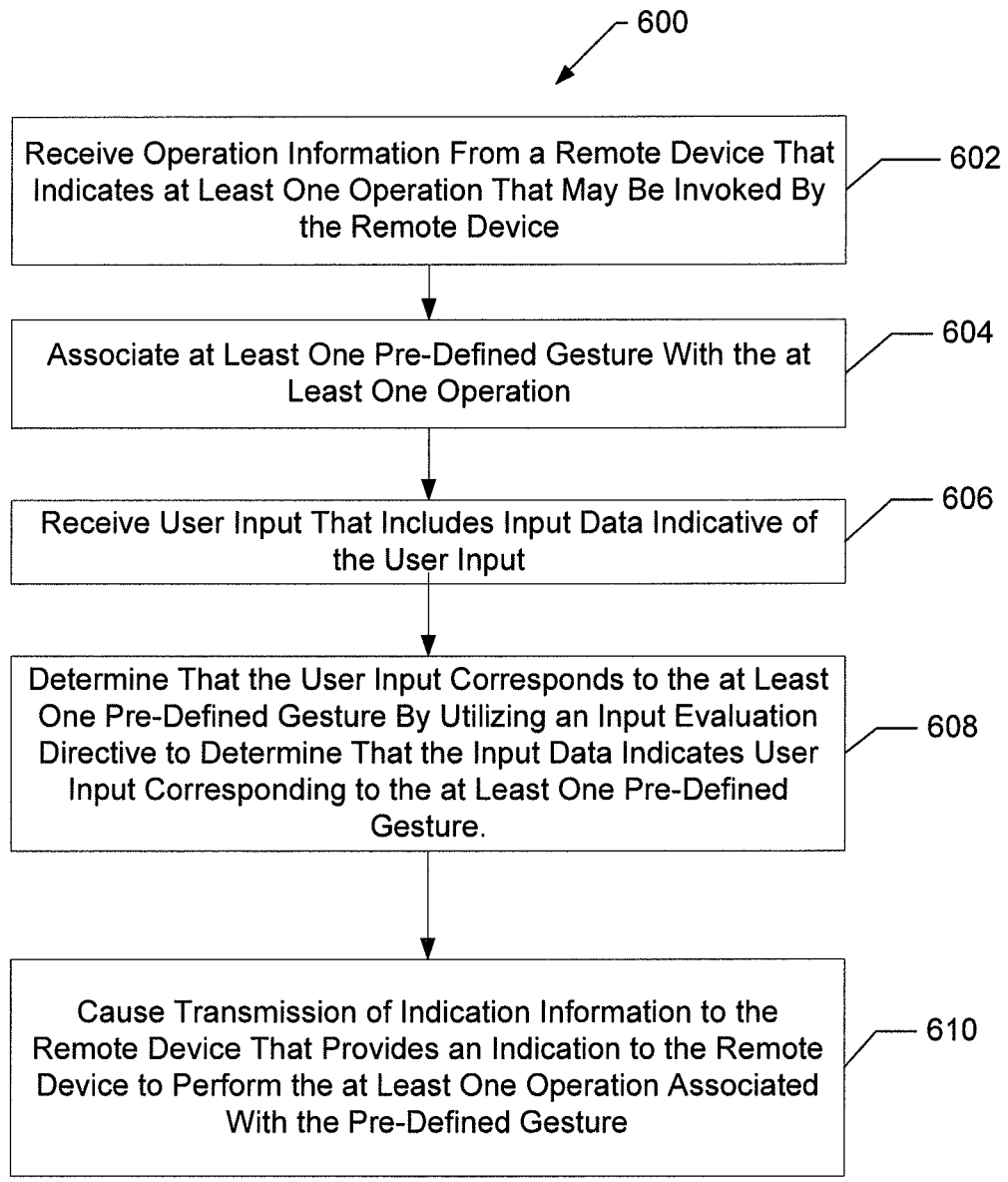
Figure 11:
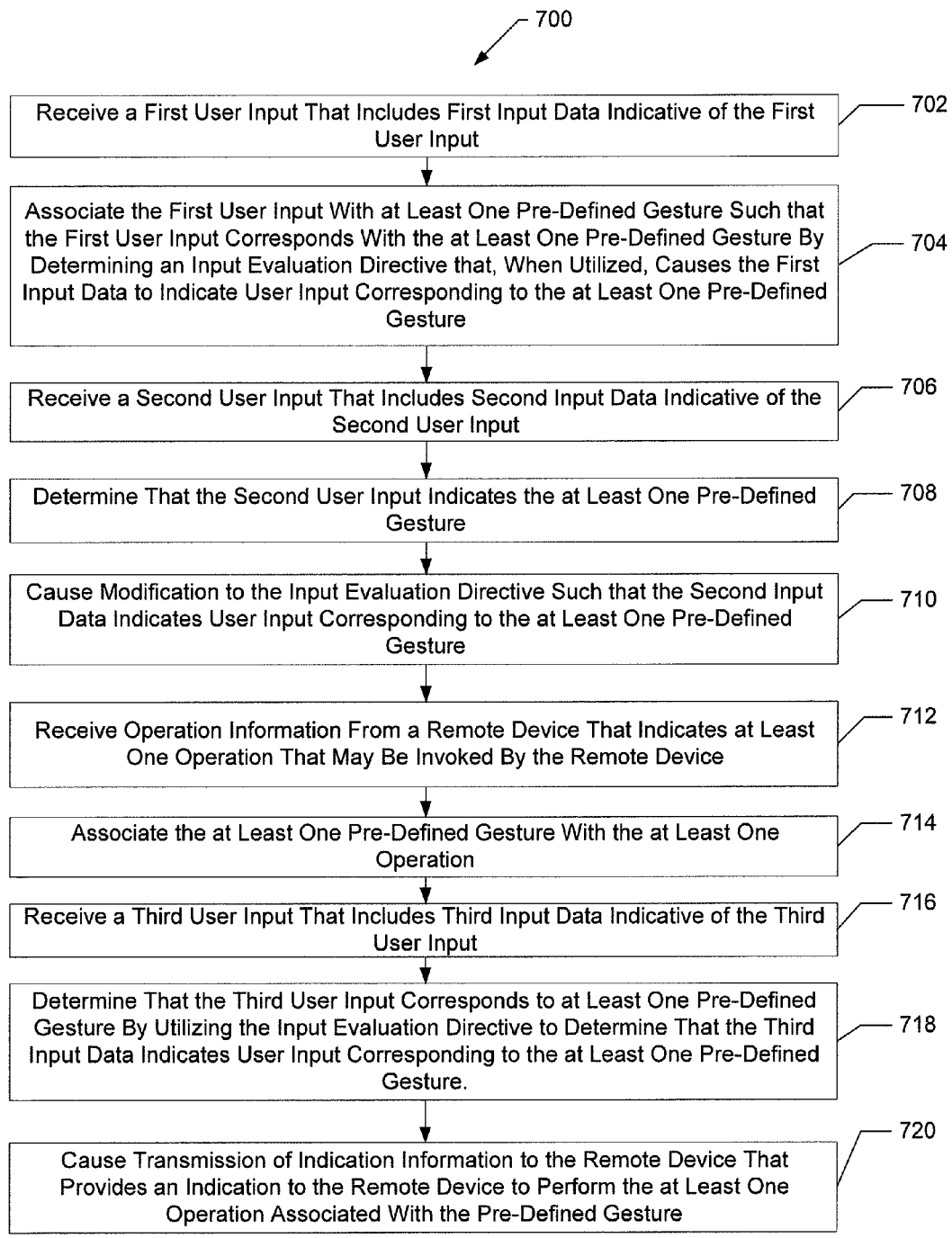

Having thus described embodiments of the invention in general terms, reference will now be made to the accompanying drawings, which are not necessarily drawn to scale, and wherein:

FIG. 1 illustrates a block diagram of an apparatus with a user interface according to an example embodiment;

FIG. 2 is a schematic block diagram of a mobile terminal according to an example embodiment;

FIGS. 3A-3B illustrate example user inputs for an apparatus, such as the apparatus illustrated in FIG. 1, in accordance with example embodiments described herein;

FIG. 4 details a flowchart illustrating an example method for associating a user input to a pre-defined gesture, in accordance with example embodiments described herein;

FIG. 4A illustrates an example user input for an apparatus, such as the apparatus in FIG. 1, wherein the user input indicates a pre-defined gesture, in accordance with example embodiments described herein;

FIG. 4B illustrates another example user input for an apparatus, such as the apparatus in FIG. 1, wherein the user input indicates the pre-defined gesture, in accordance with example embodiments described herein;

FIG. 4C illustrates another example user input for an apparatus, such as the apparatus in FIG. 1, wherein the user input indicates the pre-defined gesture, in accordance with example embodiments described herein;

FIG. 5 details a flowchart illustrating that different user input may indicate similar pre-defined gestures that correspond to the same pre-defined gesture label, in accordance with example embodiments described herein;

FIG. 6 illustrates establishment of a link between an apparatus, such as the apparatus in FIG. 1, and a remote device, in accordance with example embodiments described herein;

FIG. 6A illustrates transmission of operation information from a remote device to an apparatus, such as the apparatus in FIG. 1, in accordance with example embodiments described herein;

FIG. 7 illustrates use of the remote device by the user through an apparatus, such as the apparatus in FIG. 1, wherein use of the remote device includes increasing the volume of the remote device, in accordance with example embodiments described herein;

FIG. 8 illustrates use of the remote device by the user through an apparatus, such as the apparatus in FIG. 1, wherein an example user input performed on the apparatus corresponds to operation of the remote device, in accordance with example embodiments described herein;

FIG. 8A illustrates use of the remote device by the user through an apparatus, such as the apparatus in FIG. 1, wherein another example user input performed on the apparatus corresponds to operation of the remote device, in accordance with example embodiments described herein;

FIG. 9 illustrates a flowchart according to an example method for enabling use of a remote device with pre-defined gestures, in accordance with example embodiments described herein;

FIG. 10 illustrates a flowchart according to another example method for enabling use of a remote device with pre-defined gestures, in accordance with example embodiments described herein; and FIG. 11 illustrates a flowchart according to another example method for enabling use of a remote device with pre-defined gestures, in accordance with example embodiments described herein.

DETAILED DESCRIPTION

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the terms "data," "content," "information" and similar terms may be used interchangeably to refer to singular or plural data capable of being transmitted, received, displayed and/or stored in accordance with various example embodiments. Thus, use of any such terms should not be taken to limit the spirit and scope of the disclosure.

The term "computer-readable medium" as used herein refers to any medium configured to participate in providing information to a processor, including instructions for execution. Such a medium may take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc, or the like), a random access memory (RAM), a programmable read only memory (PROM), an erasable programmable read only memory (EPROM), a FLASH-EPROM, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

FIG. 1 illustrates a block diagram of an apparatus 102 for facilitating interaction with a user interface according to an example embodiment. It will be appreciated that the apparatus 102 is provided as an example of one embodiment and should not be construed to narrow the scope or spirit of the invention in any way. In this regard, the scope of the disclosure encompasses many potential embodiments in addition to those illustrated and described herein. As such, while FIG. 1 illustrates one example of a configuration of an apparatus for facilitating interaction with a user interface, other configurations may also be used to implement embodiments of the present invention.

The apparatus 102 may be embodied as a mobile device such as a desktop computer, laptop computer, mobile terminal, mobile computer, mobile phone, mobile communication device, game device, digital camera/camcorder, audio/video player, television device, radio receiver, digital video recorder, positioning device, a chipset, a computing device comprising a chipset, any combination thereof, and/or the like. In this regard, the apparatus 102 may comprise any computing device that comprises or is in operative communication with a touch display capable of displaying a graphical user interface. In some example embodiments, the apparatus 102 is embodied as a mobile computing device, such as the mobile terminal illustrated in FIG. 2.

In this regard, FIG. 2 illustrates a block diagram of a mobile terminal 10 representative of one example embodiment of an apparatus 102. It should be understood, however, that the mobile terminal 10 illustrated and hereinafter described is merely illustrative of one type of apparatus 102 that may implement and/or benefit from various example embodiments of the invention and, therefore, should not be taken to limit the scope of the disclosure. While several embodiments of the electronic device are illustrated and will be hereinafter described for purposes of example, other types of electronic devices, such as mobile telephones, mobile computers, personal digital assistants (PDAs), pagers, laptop computers, desktop computers, gaming devices, positioning devices, tablet computers, televisions, e-papers, and other types of electronic systems, may employ various embodiments of the invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments the processor 20 comprises a plurality of processors. These signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (e.g., digital/analog or TDMA/CDMA/analog phones). Additionally, the mobile terminal 10 may be capable of operating according to Wi-Fi or Worldwide Interoperability for Microwave Access (WiMAX) protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20a, an internal data modem (DM) 20b, and/or the like. Further, the processor may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, sensor 18, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, sensor 18, and/or the like. The processor 20 and/or user interface circuitry comprising the processor 20 may be configured to control one or more functions of one or more elements of the user interface through computer program instructions (e.g., software and/or firmware) stored on a memory accessible to the processor 20 (e.g., volatile memory 40, non-volatile memory 42, and/or the like). Although not shown, the mobile terminal may comprise a battery for powering various circuits related to the mobile terminal, for example, a circuit to provide mechanical vibration as a detectable output. The display 28 of the mobile terminal may be of any type appropriate for the electronic device in question with some examples including a plasma display panel (PDP), a liquid crystal display (LCD), a light-emitting diode (LED), an organic light-emitting diode display (OLED), a projector, a holographic display or the like. The display 28 may, for example, comprise a three-dimensional touch display, examples of which will be described further herein below. The user input interface may comprise devices allowing the mobile terminal to receive data, such as a keypad 30, a touch display (e.g., some example embodiments wherein the display 28 is configured as a touch display), a joystick (not shown), sensor 18, and/or other input device. In embodiments including a keypad, the keypad may comprise numeric (0-9) and related keys (#, *), and/or other keys for operating the mobile terminal 10. Alternatively or additionally, the keypad 30 may include a conventional QWERTY keypad arrangement.

The mobile terminal 10 may comprise memory, such as a subscriber identity module (SIM) 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Returning to FIG. 1, in an example embodiment, the apparatus 102 includes various means for performing the various functions herein described. These means may comprise one or more of a processor 110, memory 112, communication interface 114, user interface 116, sensor 118, or user interface (UI) control circuitry 122. The means of the apparatus 102 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g. memory 112) that is executable by a suitably configured processing device (e.g., the processor 110), or some combination thereof.

In some example embodiments, one or more of the means illustrated in FIG. 1 may be embodied as a chip or chip set. In other words, the apparatus 102 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. In this regard, the processor 110, memory 112, communication interface 114, sensor 118, and/or UI control circuitry 122 may be embodied as a chip or chip set. The apparatus 102 may therefore, in some cases, be configured to or may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 110 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC or FPGA, one or more other types of hardware processors, or some combination thereof. Accordingly, although illustrated in FIG. 1 as a single processor, in some embodiments the processor 110 comprises a plurality of processors. The plurality of processors may be in operative communication with each other and may be collectively configured to perform one or more functionalities of the apparatus 102 as described herein. The plurality of processors may be embodied on a single computing device or distributed across a plurality of computing devices collectively configured to function as the apparatus 102. In embodiments wherein the apparatus 102 is embodied as a mobile terminal 10, the processor 110 may be embodied as or comprise the processor 20 (shown in FIG. 2). In some example embodiments, the processor 110 is configured to execute instructions stored in the memory 112 or otherwise accessible to the processor 110. These instructions, when executed by the processor 110, may cause the apparatus 102 to perform one or more of the functionalities of the apparatus 102 as described herein. As such, whether configured by hardware or software methods, or by a combination thereof, the processor 110 may comprise an entity capable of performing operations according to embodiments of the present invention while configured accordingly. Thus, for example, when the processor 110 is embodied as an ASIC, FPGA or the like, the processor 110 may comprise specifically configured hardware for conducting one or more operations described herein. Alternatively, as another example, when the processor 110 is embodied as an executor of instructions, such as may be stored in the memory 112, the instructions may specifically configure the processor 110 to perform one or more algorithms and operations described herein.

The memory 112 may comprise, for example, volatile memory, non-volatile memory, or some combination thereof. In this regard, the memory 112 may comprise a non-transitory computer-readable storage medium. Although illustrated in FIG. 1 as a single memory, the memory 112 may comprise a plurality of memories. The plurality of memories may be embodied on a single computing device or may be distributed across a plurality of computing devices collectively configured to function as the apparatus 102. In various example embodiments, the memory 112 may comprise a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the apparatus 102 is embodied as a mobile terminal 10, the memory 112 may comprise the volatile memory 40 and/or the non-volatile memory 42 (shown in FIG. 2). The memory 112 may be configured to store information, data, applications, instructions, or the like for enabling the apparatus 102 to carry out various functions in accordance with various example embodiments. For example, in some example embodiments, the memory 112 is configured to buffer input data for processing by the processor 110. Additionally or alternatively, the memory 112 may be configured to store program instructions for execution by the processor 110. The memory 112 may store information in the form of static and/or dynamic information. The stored information may include, for example, images, content, media content, user data, application data, and/or the like. This stored information may be stored and/or used by the UI control circuitry 122 during the course of performing its functionalities.

The communication interface 114 may be embodied as any device or means embodied in circuitry, hardware, a computer program product comprising computer readable program instructions stored on a computer readable medium (e.g., the memory 112) and executed by a processing device (e.g., the processor 110), or a combination thereof that is configured to receive and/or transmit data from/to another computing device. In some example embodiments, the communication interface 114 is at least partially embodied as or otherwise controlled by the processor 110. In this regard, the communication interface 114 may be in communication with the processor 110, such as via a bus. The communication interface 114 may include, for example, an antenna, a transmitter, a receiver, a transceiver and/or supporting hardware or software for enabling communications with one or more remote computing devices. In embodiments wherein the apparatus 102 is embodied as a mobile terminal 10, the communication interface 114 may be embodied as or comprise the transmitter 14 and receiver 16 (shown in FIG. 2). The communication interface 114 may be configured to receive and/or transmit data using any protocol that may be used for communications between computing devices. In this regard, the communication interface 114 may be configured to receive and/or transmit data using any protocol that may be used for transmission of data over a wireless network, wireline network, some combination thereof, or the like by which the apparatus 102 and one or more computing devices may be in communication. As an example, the communication interface 114 may be configured to receive and/or otherwise access content (e.g., web page content, streaming media content, and/or the like) over a network from a server or other content source. The communication interface 114 may additionally be in communication with the memory 112, user interface 116, and/or UI control circuitry 122, such as via a bus.

The user interface 116 may be in communication with the processor 110 to receive an indication of a user input and/or to provide an audible, visual, mechanical, or other output to a user. As such, the user interface 116 may include, for example, a keyboard, a mouse, a joystick, a display, a touch screen display, a microphone, a speaker, and/or other input/output mechanisms. In some embodiments, a display may refer to display on a screen, on a wall, on glasses (e.g., near-eye-display), in the air, etc. In embodiments wherein the apparatus 102 is embodied as a mobile terminal 10, the user interface 116 may be embodied as or comprise the display 28 and keypad 30 (shown in FIG. 2). The user interface 116 may be in communication with the memory 112, communication interface 114, sensor 118, and/or UI control circuitry 122, such as via a bus. In some example embodiments, the user interface may comprise content display and touch display (e.g., a touch display user interface).

The UI control circuitry 122 may be embodied as various means, such as circuitry, hardware, a computer program product comprising computer readable program instructions stored on a computer readable medium (e.g., the memory 112) and executed by a processing device (e.g., the processor 110), or some combination thereof and, in some embodiments, is embodied as or otherwise controlled by the processor 110. In some example embodiments wherein the UI control circuitry 122 is embodied separately from the processor 110, the UI control circuitry 122 may be in communication with the processor 110. The UI control circuitry 122 may further be in communication with one or more of the memory 112, communication interface 114, or user interface 116, such as via a bus.

The UI control circuitry 122 may be configured to receive user input from a user interface 116, such as a touch display. The user input or signal may carry positional information indicative of the user input. In this regard, the position may comprise a position of the user input in a two-dimensional space, which may be relative to the surface of the touch display user interface. For example, the position may comprise a coordinate position relative to a two-dimensional coordinate system (e.g., an X and Y axis), such that the position may be determined. Accordingly, the UI control circuitry 122 may determine a position of the user input such as for determining a portion of the display to which the user input correlates.

The touch display may also be configured to enable the detection of a hovering gesture input. A hovering gesture input may comprise a gesture input to the touch display without making physical contact with a surface of the touch display, such as a gesture made in a space some distance above/in front of the surface of the touch display. As an example, the touch display may comprise a projected capacitive touch display, which may be configured to enable detection of capacitance of a finger or other input object by which a gesture may be made without physically contacting a display surface. As another example, the touch display may be configured to enable detection of a hovering gesture input through use of acoustic wave touch sensor technology, electromagnetic touch sensing technology, near field imaging technology, optical sensing technology, infrared proximity sensing technology, some combination thereof, or the like.

The sensor 118 may be in communication with the processor 110 and/or UI control circuitry 122. The sensor 118 may be configured to sense and/or measure user input. In some embodiments, the sensor 118 may be configured to sense movement of the apparatus 102. Additionally, in some embodiments, the sensor 118 may be configured to measure the degree and/or speed of movement of the apparatus 102. For example, in some embodiments, the sensor 118 comprises an accelerometer. In some embodiments, the sensor 118 may be configured to determine the position, location, and/or orientation of the apparatus 102. For example, in some embodiments, the sensor 118 may comprise a gyroscope. In some embodiments, the sensor 118 may comprise a camera or vision software capable of capturing and/or recognizing images. In some embodiments, the sensor 118 may be configured to sense and/or measure pressure, such as the amount of force a user applies to the user interface. In embodiments wherein the apparatus 102 is embodied as a mobile terminal 10, the sensor 118 may be embodied as or comprise the sensor 18 (shown in FIG. 2). As used herein, the sensor 118 may be comprise any type of sensor for sensing and/or measuring user input.

The apparatus 102 may be configured to receive user input and/or an indication of user input. The user input may indicate a user's desire for the apparatus 102 to perform a designated function (e.g., run an application, load a website, etc.). In some embodiments, the user input may indicate a pre-defined gesture, such as will be described in greater detail herein.

The user input may be any type of user interaction that is recognizable (e.g., sensed, measured, received, etc.) by the apparatus 102. In some embodiments, the apparatus 102 may be configured to receive input data from various components (e.g., sensor 118, UI control circuitry 122, communication interface 114, and/or user interface 116). The input data may be indicative of the user input. In some embodiments, the input data may comprise information indicative of sensor data indicative of the user input. In some cases, the sensor data may be received from the sensor 118. Additionally or alternatively, the sensor data may be received from an external source and/or sensor (e.g., a sensor located on another device that is in communication with the apparatus 102).

FIG. 3A illustrates an example user input 205 for an apparatus 200 (e.g., apparatus 102). In the depicted embodiment, a user 250 holding the apparatus 200 moves the apparatus 200 upwardly (e.g., along arrow 206). The apparatus 200 is configured to receive and/or recognize the user input 205. In some embodiments, the apparatus 200 may comprise at least one sensor (not shown), such as sensor 118, that is configured to sense the movement of the apparatus 200. In some embodiments, the apparatus 200 may receive input data indicative of the user input 205. For example, that apparatus 200 may receive input data that correlates to the apparatus 200 being moved according to user input 205 (e.g., along arrow 206). In particular, the apparatus 200 may comprise an accelerometer that senses the movement of the apparatus 200 upwardly (e.g., along arrow 206). In some embodiments, the input data may include an indication of the speed at which the apparatus 200 is being moved.

FIG. 3B illustrates another example user input 210 for an apparatus 200 (e.g., apparatus 102). In the depicted embodiment, a user 250 holding the apparatus 200 moves the apparatus 200 to the left (e.g., along arrow 207). The apparatus 200 is configured to receive and/or recognize the user input 210. In some embodiments, the apparatus 200 may comprise at least one sensor (not shown), such as sensor 118, that is configured to sense the movement of the apparatus 200. In some embodiments, the apparatus 200 may receive input data indicative of the user input 210. For example, that apparatus 200 may receive input data that correlates to the apparatus 200 being moved according to user input 210 (e.g., along arrow 207). In particular, the apparatus 200 may comprise an accelerometer that senses the movement of the apparatus 200 towards the left (e.g., along arrow 207). In some embodiments, the input data may include an indication of the speed at which the apparatus 200 is being moved.

As indicated above, there are many types of user inputs that are recognizable by apparatus 102. Some additional known user inputs include shaking the apparatus 102, applying user input to the user interface 116 of the apparatus 102 (e.g., perform a swipe gesture, touching input, etc.), among others. As noted above, the apparatus 102 may include many types of components that enable receipt and/or recognition of user input. As such, the input data indicative of the user input may comprise any type of input from any and or all of the components (e.g., multiple different inputs may combine to define the input data indicative of the user input). For example, the user interface 116 may receive a touch input (e.g., from a user's thumb being pressed on the touch display) and the sensor 118 may sense that the apparatus 102 is being moved upwardly (e.g., a user is moving the apparatus upwardly). In such a case, the input data may comprise a combination of the touch input and the sensing of the movement of the apparatus.

Some embodiments of the present invention contemplate use of gestures for interaction with remote devices. In some embodiments, the gestures may be pre-defined. A pre-defined gesture may be any type of gesture and/or interaction that can be performed with the apparatus 102. In some embodiments, a predefined gesture may correlate to a gesture that is commonly performed (e.g., universal). Though example embodiments may refer to certain types of pre-defined gestures, embodiments of the present invention may utilize any type of pre-defined gesture, and are not meant to be limited.

As noted above, apparatuses, such as apparatus 102, may be configured to receive and/or recognize many different types of user input. Moreover, different users of apparatuses may perform user input in different ways (e.g., variation in directions, speed, degree, etc.). Despite this, some embodiments of the present invention seek to define a set (e.g., list) of pre-defined gestures that are commonly used such that the pre-defined gestures may be used as a common language for interaction with remote devices, as will be described in greater detail herein.

In some embodiments, the apparatus 102 may be configured to associate a received user input with at least one pre-defined gesture. As noted above, the apparatus 102 may be personal to a user, and as such, the user may uniquely perform user input. In some embodiments, the apparatus 102 may be configured to receive and/or recognize the user input, and in response, determine a pre-defined gesture that likely corresponds to the user input. Additionally, in some embodiments, the apparatus 102 may be configured to associate the user input with that pre-defined gesture. Such an embodiment may be referred to as assignment mode (e.g., associating user input with a pre-defined gesture).

In some embodiments, the apparatus 102 may enter a set-up period that presents a pre-defined gesture to the user and further prompts the user to perform a user input to associate with the pre-defined gesture. As such, in some embodiments, association between a user input and a pre-defined gesture may be customizable by the user. Similarly, the pre-defined gestures may be customizable, such that in some embodiments, the user may change the types of pre-defined gestures and/or define different/new pre-defined gestures.

In some embodiments, the apparatus 102 may be configured to automatically associate user input with a pre-defined gesture. For example, the apparatus 102 may be configured to associate user input that is frequently performed by the user with pre-defined gestures. Such association may occur without knowledge of the association by the user. For example, the association between the user input and the pre-defined gesture may occur over the course of use of the apparatus 102 by the user.

In some embodiments, the apparatus 102 may be configured to store the association between the user input and the pre-defined gestures. For example, the apparatus 102 may store the association between the user input and the pre-defined gesture in the memory 112. As such, the apparatus 102 may be able to access the association between the user input and the pre-defined gesture.

In some embodiments, the apparatus 102 may be configured to receive user input and associate the user input with a pre-defined gesture by utilizing an input evaluation directive. For example, as noted above, the apparatus 102 may be configured to receive user input by receiving various input data from the components (e.g., user interface 116, UI control circuitry 122, sensor 118, etc.). As also noted above, the input data may be a combination of input data. Additionally, the pre-defined gesture may be a commonly performed gesture (e.g., a universal gesture), which may not directly match the received input data indicating the received user input. As such, the apparatus 102 may be configured to convert/adapt the input data to equate it to the pre-defined gesture. In some embodiments, the apparatus 102 may be configured to use an input evaluation directive to convert/adapt the input data to the pre-defined gesture. Additionally, the apparatus 102 may be configured to store the input evaluation directive with the pre-defined gesture and the corresponding user input.

FIG. 4 illustrates an example method 260 for associating a user input to a pre-defined gesture, such as may be performed with apparatus 102. In the depicted embodiment, the user performs the gestures at operation 262. The apparatus (e.g., apparatus 102) may receive input data indicative of the user input at operation 264. The apparatus may then be configured to determine an input evaluation directive that converts/adapts the input data to the pre-defined gesture at operation 266. Finally, the apparatus may associate the user input with the pre-defined gesture at operation 268. In some embodiments, the apparatus may associate the received input data and/or determined input evaluation directive with the pre-defined gesture and/or user input. Additionally, in some embodiments, the apparatus may be configured to store the association between the user input and the pre-defined gesture (e.g., including the received input data and/or the determined input evaluation directive).

In some embodiments, once a user input is associated with a pre-defined gesture the apparatus 102 may be configured to receive the user input and determine that the user input corresponds with a pre-defined gesture. In some embodiments, the apparatus 102 may be configured to receive input data indicating the user input and utilize an input evaluation directive to determine that the input data indicates user input corresponding to a pre-defined gesture. For example, the apparatus 102 may receive user input and/or input data indicating a user input and may be configured to access the stored association of pre-defined gestures to find an associated pre-defined gesture. In some embodiments, the apparatus 102 may be configured to determine that the received user input (e.g., input data) corresponds with user input and/or input data that are associated with a pre-defined gesture. Additionally or alternatively, the apparatus 102 may be configured to apply an input evaluation directive to the user input and/or input data to determine if the user input and/or input data correspond to (e.g., are associated with) a pre-defined gesture. As such, the apparatus 102 may be configured to receive user input and be able to determine that the user wishes the corresponding pre-defined gesture to be performed.

As noted above, different users may perform different user input, but may wish to indicate a similar pre-defined gesture. Likewise, the same user may perform a different (often slightly different) user input, but still wish to indicate a similar pre-defined gesture. For example, in some embodiments, different user inputs, and their associated pre-defined gestures, may relate to/correspond with a pre-defined gesture label, such as an overall gesture theme. Though used herein as an additional abstract level of at least one pre-defined gesture, in some embodiments, the pre-defined gesture label may be the same as the pre-defined gesture and, thus, the pre-defined gesture label and pre-defined gesture may be used interchangeably.

As such, in some embodiments, the apparatus 102 may be configured to receive different user inputs but associate them with the same pre-defined gesture label. For example, FIGS. 4A, 4B, and 4C illustrate three different user inputs that may be associated with the same pre-defined gesture label, such as an "up" gesture. As described in greater detail herein, the "up" gesture may correspond to a number of different operations that a remote device can perform (e.g., increasing volume, scrolling up, etc.).

FIG. 4A illustrates an example user input 220 that a user 250 may perform to indicate a desired pre-defined gesture label. In the depicted embodiment, the user 250 holding the apparatus 200 (e.g., apparatus 102) may move the apparatus 200 in a large upward sweeping motion, such as along arrow 222. This large upward sweeping motion may define the user input 220, which the apparatus 200 may be configured to receive, such as through input data from its various components. The apparatus 200 may receive the user input 220 and determine that the user input 220 corresponds with a pre-defined gesture (e.g., a "large upward flick" gesture). Additionally, in some embodiments, the apparatus 200 may be configured to determine that the user input 220 corresponds with a pre-defined gesture label (e.g., the "up" gesture).

FIG. 4B illustrates another example user input 220' that a user 250 may perform to indicate a desired pre-defined gesture label, which may be the same pre-defined gesture label as in FIG. 4A. In the depicted embodiment, the user 250 holding the apparatus 200 (e.g., apparatus 102) may move the apparatus 200 in a small upward sweeping motion, such as along arrow 222'. This small upward sweeping motion may define the user input 220', which the apparatus 200 may be configured to receive, such as through input data from its various components. This received input data indicating the user input 220' may be different than the input data indicating the user input 220. For example, the apparatus 200 may comprise a sensor that receives a different (e.g., smaller) input from user input 220' than from user input 220. However, the apparatus 200 may receive the user input 220' and determine that the user input 220' corresponds with a similar pre-defined gesture (e.g., a "small upward flick" gesture). Additionally, in some embodiments, the apparatus 200 may be configured to determine that the user input 220' corresponds with the same pre-defined gesture label (e.g., the "up" gesture).

FIG. 4C illustrates another example user input 220" that a user 250 may perform to indicate a desired pre-defined gesture label, which may be the same pre-defined gesture label as in FIGS. 4A and 4B. In the depicted embodiment, the user 250 may position their finger 207 on the display 208 of the apparatus 200 and move their finger 207 upwardly (e.g., along arrow 223) on the display 208 (e.g., perform a swipe gesture). This swipe gesture performed on the display 208 may define the user input 220", which the apparatus 200 may be configured to receive, such as through input data from its various components (e.g., the display 208). This received input data indicating the user input 220" may be different than the input data indicating the user input 220 or the input data indicating the user input 220'. For example, the input data indicating user input 220" may be received by the user interface (e.g., display 208), whereas the input data indicating user input 220' may be received by a sensor that receives a smaller input indicating a small upward sweeping motion. However, the apparatus 200 may receive the user input 220" and determine that the user input 220" corresponds with a similar pre-defined gesture (e.g., an "upward swipe" gesture). Additionally, in some embodiments, the apparatus 200 may be configured to determine that the user input 220" corresponds with the same pre-defined gesture label (e.g., the "up" gesture).

Though the user may perform different user inputs (e.g., user inputs 220, 220', and 220"), the apparatus 102 may be configured to determine that each user input corresponds to the same pre-defined gesture label (e.g., the "up" gesture). To accomplish this, in some embodiments, the apparatus 102 may be configured to define a different input evaluation directive that causes each individual user input (and/or input data indicating the user input) to be converted/adapted to correspond with a pre-defined gesture, which may correspond to the same pre-defined gesture label. For example, FIG. 5 illustrates how an apparatus may define different input evaluation directives to cause different user inputs to correspond to pre-defined gestures that correspond to the same pre-defined gesture label. In particular, a first user input (310) may be defined by first input data indicating the first user input (312). The first input data (312) may be converted/adapted with a first input evaluation directive (314) to correspond to the first pre-defined gesture (316). This first pre-defined gesture (316) may correspond to a pre-defined gesture label (340). A second user input (320) may be defined by second input data indicating the second user input (322). The second input data (322) may be converted/adapted with a second input evaluation directive (324) to correspond to the second pre-defined gesture (326). This second pre-defined gesture (326) may correspond to the same pre-defined gesture label (340). A third user input (330) may be defined by third input data indicating the third user input (332). The third input data (332) may be converted/adapted with a third input evaluation directive (334) to correspond to the third pre-defined gesture (336). This third pre-defined gesture (336) may correspond to the same pre-defined gesture label (340). As such, as noted above, the first, second, and third input evaluation directive may be different and each be designed to properly convert/adapt their respective user inputs and/or input data indicating their respective user inputs into pre-defined gestures that correspond to the same pre-defined gesture label.

Over time the user of the apparatus 102 may alter the way they perform user input. Such a change may be slight, or in some cases, may be significant. For example, with reference to FIG. 4A, a user 250 may first start performing a large upward sweeping input (e.g., user input 220). Then, later, perhaps as time passes, a user may slowly change to perform smaller upward sweeping input (e.g., user input 220' shown in FIG. 4B). In some embodiments, the apparatus 102 may be configured to adapt the association between the user input and the pre-defined gesture. For example, the apparatus 102 may be configured to train itself to recognize the new/different user input as corresponding to the pre-defined gesture. In some cases, the apparatus 102 may be configured to automatically train itself to adapt to new execution of user input. This may be referred to as the apparatus being in a training mode.

In some embodiments, an apparatus 102 may have previously associated a user input with a pre-defined gesture. For example, the user input 220 (e.g., the large upward sweeping input of FIG. 4A) may be associated with a pre-defined gesture (e.g., the "upward flick" gesture). In such a circumstance, the apparatus 102 may be configured to receive a second user input (e.g., user input 220' defined by a small upward sweeping input, as shown in FIG. 4B). In some embodiments, the apparatus 102 may be configured to determine that the second user input indicates the pre-defined gesture. For example, in some embodiments, the apparatus 102 may be configured to compare the second user input and/or second input data indicating the second user input with the first user input and/or first input data indicating the first user input. In an instance in which the second user input/input indicating the second user input is sufficiently similar to the first user input/input indicating the first user input, the apparatus may determine that the second user input indicates the pre-defined gesture. In another example, in some embodiments, the apparatus 102 may be configured to determine that the second input data indicating the second user input is within a minimum threshold of (e.g., sufficiently similar to) the first input data indicating the first user input. As a further explanation, the apparatus 102 may receive second input data that indicates a small upward sweeping input. The apparatus 102 may compare the degree of upward sweeping input and determine that the degree of upward sweeping input is within a minimum threshold of the previously associated first input data indicating the first user input.

Once the apparatus 102 determines that the second user input indicates the pre-defined gesture, in some embodiments, the apparatus 102 may be configured to cause modification to the input evaluation directive (e.g., the first input evaluation directive associated with the first user input and the pre-defined gesture). In some embodiments, the apparatus 102 may be configured to cause modification to the input evaluation directive such that the second user input data indicates user input corresponding to (e.g., associated with) the pre-defined gesture. For example, in the case where the second user input defines a small upward sweeping input, the apparatus may modify the input evaluation directive corresponding to the pre-defined gesture to enable conversion/adaptation from the second input data indicating the second user input to the pre-defined gesture. Such a modification may enable the apparatus 102 to receive the second user input and determine that the second user input indicates the pre-defined gesture.

As such, between the assignment and set-up mode and the training mode, in some embodiments, apparatus 102 may be configured to develop and maintain a list of pre-defined gestures associated with user input. Additionally, in some embodiments, the apparatus 102 may be configured to associate the pre-defined gestures with at least one pre-defined gesture label. Such an embodiment would create a dynamic apparatus that can receive types of user input and determine that the user is indicating corresponding pre-defined gestures. Thus, in some embodiments, the assignment and training mode, which causes the list of pre-defined gestures to become associated with user input, may occur prior to interaction between an apparatus and a remote device, such example interaction being described herein.

The increase in advanced technology has caused interactive systems to become increasingly available to the public. Such systems are useful for performing any number of different functions. However, due the vast array of functionality, these interactive public systems may include functionality that is new or foreign to certain users. Thus, it can be difficult for a user to interact with such systems.

Since use of apparatuses, such as apparatus 102, are known to a user, it may be useful for such apparatuses to aid in the interaction with these public systems. In particular, in some embodiments, the apparatus 102 may utilize the learned/trained pre-defined gestures, which are associated with the user input specific to the user. These pre-defined gestures may act as a universal language and can be utilized by the apparatus 102 to associate with and/or indicate that certain functionality of the public systems should be performed. As such, embodiments of the present invention enable use of a remote device (e.g., an interactive public system) with the user's apparatus, and more particularly, with pre-defined gestures trained for a specific user and recognizable by the apparatus. FIGS. 6, 6A, and 7, which will be referenced herein, illustrate an example interaction between a user with an apparatus and a remote device through a pre-defined gesture. While this example describes increasing volume on a speaker of a remote device and use of a pre-defined gesture corresponding to an "up" gesture (e.g., a pre-defined gesture label), other operations and pre-defined gestures are conceived for embodiments of the present invention. As such, this example interaction is included for explanatory purposes and is not meant to limit embodiments of the present invention.

In some embodiments, the apparatus 102 may be configured to recognize/detect a remote device, such as any type of interactive public system. In some embodiments, the remote device may include embedded software that enables interaction (e.g., any interaction described herein) with an apparatus, such as apparatus 102. In some embodiments, the apparatus 102 may come within a pre-determined distance that may correspond to the ability of the apparatus to transmit and receive signals from the remote device. Additionally, in some embodiments, the apparatus 102 may be configured to establish a link with the remote device. For example, with reference to FIG. 6, a user 250 holding an apparatus 200 (e.g., apparatus 102) may approach a kiosk 400 (e.g., a remote device), such as before entering a subway terminal. The kiosk 400 may comprise a communication interface (not shown) that is configured to transmit and receive signals (e.g., information, data, instructions, etc.). Additionally, the kiosk 400 may comprise a display 405 and a speaker 406. The kiosk 400 may recognize and/or detect the apparatus 200 carried by the user. In the depicted embodiment, the kiosk 400 and the apparatus 200 establish a link 410 that enables transmission and receipt of signals between the apparatus 200 and kiosk 400.

In some embodiments, the remote device may be configured to transmit signals that can be received by the apparatus 102. As such, the apparatus 102 may be configured to receive a signal from the remote device. For example, with reference to FIG. 6A, a user 250 holding an apparatus 200 (e.g., apparatus 102) may approach the kiosk 400. The kiosk 400 may be configured to transmit a signal 411 that is received by the apparatus 200.

As noted above, these remote devices may have functionality that a user may wish to interact with. As such, the remote device may comprise at least one operation that may be performed by the remote device. In some embodiments, the remote device may be configured to transmit operation information. In some cases, the operation information may indicate at least one operation that may be invoked by the remote device. As such, in some embodiments, the apparatus 102 may be configured to receive the operation information from the remote device, which may include an indication of at least one operation that may be invoked by the remote device. For example, with reference to FIG. 6A, the apparatus 200 may receive operation information in signal 411. The operation information 411 may indicate an operation that may be invoked by the remote device. For example, the operation may comprise the ability of the remote device to manipulate (e.g., increase, decrease, mute, etc.) the volume for the speaker 406 of the kiosk 400, such that the volume of the noise 407 (e.g., instructions for using the subway) emanating from the speaker 406 can be manipulated by the user 250.

With the knowledge of which operations may be invoked by the remote device, the apparatus 102 may be configured to map (e.g., associate/match) pre-defined gestures with the available operations. In some embodiments, the apparatus 102 may be configured to associate at least one pre-defined gesture with at least one operation. Likewise, in some embodiments, the apparatus 102 may be configured to associate at least one pre-defined gesture label (and, thus, the corresponding pre-defined gesture) with at least one operation.

In some embodiments, association between a pre-defined gesture and an operation may be intuitive. For example, with reference to FIG. 6A, the apparatus 200, may associate an operation that increases the volume of speaker 406 on the kiosk 400 with a pre-defined gesture corresponding to an "up" gesture, such as the pre-defined gesture corresponding with the user input 220 shown in FIG. 4A. Though such an example embodiments includes an intuitive association, in some embodiments, association between a pre-defined gesture and an operation may be determined by any criteria, and may not necessarily be intuitive (e.g., increasing the volume of a speaker may be associated with a pre-defined gesture corresponding to a "left" gesture). Additionally, association between pre-defined gestures and available operations may not be limited to a one to one ratio, as multiple pre-defined gestures may be associated with an available operation, and vice versa.

In some embodiments, the remote device may be configured to provide help or guidance to apparatuses, such as apparatus 102, for proper (or intuitive) association between pre-defined gestures and the operations that may be invoked by the remote device. For example, in some embodiments, the remote device may be configured to transmit at least one guidance directive to the apparatus, such as within the operation information. The guidance directive may provide guidance for matching (e.g., associating) the operations of the remote device to pre-defined gestures. In some embodiments, the guidance directive indicates a suggested type of pre-defined gesture to associate with the at least one operation. Likewise, in some embodiments, the guidance directive may indication a suggested pre-defined gesture label to associate with at least one operation. As an example, the kiosk 400 in FIG. 6A may be configured to transmit a guidance directive in the signal 411 that indicates that the apparatus should associate a pre-defined gesture corresponding to an "up" gesture with the operation that increases volume for the speaker 406.

In some embodiments, the apparatus 102 may be configured to receive a signal from the remote device that includes a guidance directive. In some embodiments, the apparatus 102 may be configured to receive operation information that includes a guidance directive indicating a suggested type of pre-defined gesture (or suggested pre-defined gesture label) to associate with the at least one operation. Additionally, in some embodiments, the apparatus 102, may be configured to associate at least one pre-defined gesture with at least one operation capable of being invoked by the remote device, based at least in part on the guidance directive. For example, in the embodiment where the kiosk 400 sends a guidance directive that suggests association between increasing the volume of the speaker 406 (e.g., operation for the remote device) with an "upward" type gesture (e.g., type of pre-defined gesture), the apparatus 200 may associate the operation of increasing volume of the speaker 406 with a pre-defined gesture corresponding to an "up" gesture, such as the pre-defined gesture corresponding with the user input 220 shown in FIG. 4A.

In some embodiments, the association by the apparatus 102 between the at least one pre-defined gesture and the at least one available operation may be customizable by the user. In some embodiments, the apparatus 102 may be configured to enable the user to associate at least one pre-defined gesture with at least one operation. For example, in some embodiments, the apparatus 102 may be configured to present a list of operations capable of being invoked by the remote device to the user. Additionally, the apparatus 102 may be configured to present a list of available pre-defined gestures, such that the user may individually associate at least one pre-defined gesture with at least one available operation.

Once an apparatus has recognized a remote device (e.g., established link, received operation information) and associated at least one pre-defined gesture with at least one operation capable of being invoked by the remote device, a user may begin interaction with the remote device through user input performed on the apparatus. In some embodiments, the apparatus 102 may be configured to receive user input, such as after associating at least one pre-defined gesture with at least one operation. For example, with reference to FIG. 7, the apparatus 200 may receive user input 420. In the depicted embodiment, the user 250 holding the apparatus 200 may perform an upward sweeping input, such as along arrow 421. The apparatus 200 may receive the user input 420, which in some embodiments, may comprise receiving input data indicating user input 420.

As described in greater detail previously, the apparatus 102 may be configured to receive the user input and determine that the user input corresponds to at least one pre-defined gesture. For example, the apparatus 200 may receive user input 420 and/or input data indicating user input 420, and determine that the user input 420 and/or input data indicating user input 420 corresponds to a pre-defined gesture corresponding to an "up" gesture.

In some embodiments, the apparatus 102 may be configured cause transmission of indication information to the remote device. In some embodiments, the indication information may provide an indication to the remote device to perform the at least one operation associated with the pre-defined gesture (e.g., the pre-defined gesture corresponding to the received user input). For instance, once the apparatus 102 determines a correspondence between a received user input and a pre-defined gesture, the apparatus 102 may cause transmission of the pre-defined gesture and/or associated operation to the remote device. In particular, the transmission may include an indication for the remote device to perform the operation. As such, the transmission may include both the pre-defined gesture (and/or pre-defined gesture label) and the associated operation, or in some embodiments, may simply include an indication to perform the operation. For example, with reference to FIG. 7, once the user 250 performs user input 420 and the apparatus 200 receives the user input 420 and determines that it corresponds to a pre-defined gesture corresponding to an "up" gesture, the apparatus 200 may cause transmission of indication information, such as through signal 415. The indication information may include an indication for the kiosk 400 to increase the volume of the speaker 406. As such, the kiosk 400 may receive the indication, and accordingly, increase the volume of the noise 407' of the speaker 406. Thus, the user 250 may be more easily able to hear the noise 407' (e.g., instructions) being emitted by the speaker 406 of the kiosk 400.

As noted above, a pre-defined gesture may include a degree/amount of performance of the gesture (e.g., fast, slow, large, small, etc.). As such, the apparatus 102 may be configured to sense and/or measure the degree/amount of performance and provide the degree/amount (or an indication of the degree) to the remote device, such that the remote device may perform the associated operation based at least in part on the degree/amount of performance of the pre-defined gesture. For example, with reference to FIG. 7, if the pre-defined gesture corresponding to the "up" gesture is performed quickly by the user 250, the corresponding rate of increase in volume of the speaker 406 may be performed quickly as well.

As noted above, embodiments of the present invention contemplates and accounts for different users performing different user input, but still wishing the same operation to be performed on the remote device. As such, due to the configurable, trainable, and generally user specific nature of the association between the received user input and the pre-defined gesture, different types of user input may ultimately cause the same operation to be performed by the remote device. For example, FIG. 8 illustrates one example user input 455 with an end result of the display 430 scrolling to the left (e.g., arrow 456), while FIG. 8A illustrates a second, different user input 455' with the same end result of the display 430 scrolling to the left (e.g., arrow 456).

FIG. 8 shows a user 250, who is holding an apparatus 200, performing a linear swipe in the leftward direction (e.g., along arrow 457). The apparatus 200 receives the user input 455 and determines that it corresponds to a pre-defined gesture corresponding to a "left" gesture. The apparatus 200 then causes transmission of indication information 458 to the display 430, wherein the indication information includes an indication to scroll left. The display 430 receives the indication information, and in response, scrolls to the left. For instance, the display 430 may be currently displaying 5 books ("A", "B", "C", "D", and "E"), with book "C" 440 currently highlighted (e.g., enlarged), such as for selection and/or focus by the user 250. The display 430 may display books "A" and "B" 435 to the left of book "C" and books "D" and "E" 445 to the right of book "C", such as in a smaller size. In response to the indication to scroll left by the apparatus 200, the display 430 may move all the books to the left, causing book "C" to decrease in size and causing book "D" to enlarge.

FIG. 8A shows a user 250', who is holding an apparatus 200', performing a non-linear swipe in the leftward direction (e.g., along arrow 457'). As such, the user input 455 of FIG. 8 is different than the user input 455' of FIG. 8A. The apparatus 200' receives the user input 455' and determines that it corresponds to a pre-defined gesture corresponding to a "left" gesture. The apparatus 200' then causes transmission of indication information 458 (which in some embodiments may be the same indication information as transmitted in FIG. 8) to the display 430, wherein the indication information includes an indication to scroll left. The display 430 receives the indication information, and in response, scrolls to the left (just as in the illustration of FIG. 8). For instance, the display 430 may be currently displaying 5 books ("A", "B", "C", "D", and "E"), with book "C" 440 currently highlighted (e.g., enlarged), such as for selection and/or focus by the user 250. The display 430 may display books "A" and "B" 435 to the left of book "C" and books "D" and "E" 445 to the right of book "C", such as in a smaller size. In response to the indication to scroll left by the apparatus 200, the display 430 may move all the books to the left, causing book "C" to decrease in size and causing book "D" to enlarge.

As such, the examples of FIGS. 8 and 8A illustrate that different user inputs (e.g., 455 and 455') may result in the same operation being performed by the remote device (e.g., display 430). Additionally, in some embodiments, as in the depicted embodiments, after determination of the pre-defined gesture, the remaining events may be the same. For example, the transmission signal 458 is the same in both FIG. 8 and FIG. 8A. As such, embodiments of the present invention provide an apparatus that is customizable and specific to the user, but still enables universal control of remote devices.

Embodiments of the present invention provide methods, apparatus and computer program products for enabling use of a remote device with pre-defined gestures. Various examples of the operations performed in accordance with embodiments of the present invention will now be provided with reference to FIGS. 9-11.

FIG. 9 illustrates a flowchart according to an example method for enabling use of a remote device with pre-defined gestures according to an example embodiment 500. The operations illustrated in and described with respect to FIG. 9 may, for example, be performed by, with the assistance of, and/or under the control of one or more of the processor 110, memory 112, communication interface 114, user interface 116, sensor 118, or UI control circuitry 122. Operation 502 may comprise receiving operation information from a remote device that indicates at least one operation that may be invoked by the remote device. The processor 110, user interface 116, communication interface 114, sensor 118, and/or UI control circuitry 122 may, for example, provide means for performing operation 502. Operation 504 may comprise associating at least one pre-defined gesture with the at least one operation. The processor 110 may, for example, provide means for performing operation 504. Operation 506 may comprise receiving user input. The processor 110, user interface 116, communication interface 114, sensor 118, and/or UI control circuitry 122 may, for example, provide means for performing operation 506. Operation 508 may comprise determining that the user input corresponds to the at least one pre-defined gesture. The processor 110 may, for example, provide means for performing operation 508. Operation 510 may comprise causing transmission of indication information to the remote device that provides an indication to the remote device to perform the at least one operation associated with the pre-defined gesture. The processor 110 and/or communication interface 114 may, for example, provide means for performing operation 510.

FIG. 10 illustrates a flowchart according to an example method for enabling use of a remote device with pre-defined gestures according to an example embodiment 600. The operations illustrated in and described with respect to FIG. 10 may, for example, be performed by, with the assistance of, and/or under the control of one or more of the processor 110, memory 112, communication interface 114, user interface 116, sensor 118, or UI control circuitry 122. Operation 602 may comprise receiving operation information from a remote device that indicates at least one operation that may be invoked by the remote device. The processor 110, user interface 116, communication interface 114, sensor 118, and/or UI control circuitry 122 may, for example, provide means for performing operation 602. Operation 604 may comprise associating at least one pre-defined gesture with the at least one operation. The processor 110 may, for example, provide means for performing operation 604. Operation 606 may comprise receiving user input that includes input data indicative of the user input. The processor 110, user interface 116, communication interface 114, sensor 118, and/or UI control circuitry 122 may, for example, provide means for performing operation 606. Operation 608 may comprise determining that the user input corresponds to the at least one pre-defined gesture by utilizing an input evaluation directive to determine that the input data indicates user input corresponding to the at least one pre-defined gesture. The processor 110 may, for example, provide means for performing operation 608. Operation 610 may comprise causing transmission of indication information to the remote device that provides an indication to the remote device to perform the at least one operation associated with the pre-defined gesture. The processor 110 and/or communication interface 114 may, for example, provide means for performing operation 610.

FIG. 11 illustrates a flowchart according to an example method for enabling use of a remote device with pre-defined gestures according to an example embodiment 700. The operations illustrated in and described with respect to FIG. 11 may, for example, be performed by, with the assistance of, and/or under the control of one or more of the processor 110, memory 112, communication interface 114, user interface 116, sensor 118, or UI control circuitry 122. Operation 702 may comprise receiving a first user input that includes first input data indicative of the first user input. The processor 110, user interface 116, communication interface 114, sensor 118, and/or UI control circuitry 122 may, for example, provide means for performing operation 702. Operation 704 may comprise associating the first user input with at least one pre-defined gesture such that the first user input corresponds with the at least one pre-defined gesture by determining an input evaluation directive that, when utilized, causes the first input data to indicate user input corresponding to the at least one pre-defined gesture. The processor 110 may, for example, provide means for performing operation 704.

Operation 706 may comprise receiving a second user input that includes second input data indicative of the second user input. The processor 110, user interface 116, communication interface 114, sensor 118, and/or UI control circuitry 122 may, for example, provide means for performing operation 706. Operation 708 may comprise determining that the second user input corresponds to the at least one pre-defined gesture. The processor 110 may, for example, provide means for performing operation 708. Operation 710 may comprise causing modification to the input evaluation directive such that the second input data indicates user input corresponding to the at least one pre-defined gesture. The processor 110 may, for example, provide means for performing operation 710.

Operation 712 may comprise receiving operation information from a remote device that indicates at least one operation that may be invoked by the remote device. The processor 110, user interface 116, communication interface 114, sensor 118, and/or UI control circuitry 122 may, for example, provide means for performing operation 712. Operation 714 may comprise associating the at least one pre-defined gesture with the at least one operation. The processor 110 may, for example, provide means for performing operation 714. Operation 716 may comprise receiving a third user input that includes third input data indicative of the third user input. The processor 110, user interface 116, communication interface 114, sensor 118, and/or UI control circuitry 122 may, for example, provide means for performing operation 716. Operation 718 may comprise determining that the third user input corresponds to the at least one pre-defined gesture by utilizing the input evaluation directive to determine that the third input data indicates user input corresponding to the at least one pre-defined gesture. The processor 110 may, for example, provide means for performing operation 718. Operation 720 may comprise causing transmission of indication information to the remote device that provides an indication to the remote device to perform the at least one operation associated with the pre-defined gesture. The processor 110 and/or communication interface 114 may, for example, provide means for performing operation 720.

FIGS. 9-11 each illustrate a flowchart of a system, method, and computer program product according to an example embodiment. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a mobile terminal, server, or other computing device (for example, in the memory 112) and executed by a processor in the computing device (for example, by the processor 110). In some embodiments, the computer program instructions comprising the computer program product(s) which embody the procedures described above may be stored by memory devices of a plurality of computing devices. As will be appreciated, any such computer program product may be loaded onto a computer or other programmable apparatus (for example, an apparatus 102) to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus (for example, an apparatus 102) to cause a series of operations to be performed on the computer or other programmable apparatus to produce a computer-implemented process such that the instructions which execute on the computer or other programmable apparatus implement the functions specified in the flowchart block (s).

Accordingly, blocks of the flowcharts support combinations of means for performing the specified functions. It will also be understood that one or more blocks of the flowcharts, and combinations of blocks in the flowcharts, may be implemented by special purpose hardware-based computer systems which perform the specified functions, or combinations of special purpose hardware and computer program product (s).

The above described functions may be carried out in many ways. For example, any suitable means for carrying out each of the functions described above may be employed to carry out embodiments of the invention. In one embodiment, a suitably configured processor (for example, the processor 110) may provide all or a portion of the elements. In another embodiment, all or a portion of the elements may be configured by and operate under control of a computer program product. The computer program product for performing the methods of an example embodiment of the invention includes a computer-readable storage medium (for example, the memory 112), such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A method comprising:
    receiving operation information from a remote device, wherein the operation information indicates at least one operation that may be invoked by the remote device;
    associating, by a processor, at least one pre-defined gesture with the at least one operation;
    receiving user input from a user, wherein the user input is defined by input data indicative of the user input;
    applying an input evaluation directive to the input data to form modified user input data, wherein the input evaluation directive defines a conversion that is customized to the user;
    determining that the modified user input corresponds to the at least one pre-defined gesture; and
    causing transmission of indication information to the remote device, wherein the indication information provides an indication to the remote device to perform the at least one operation associated with the pre-defined gesture.

2. The method according to claim 1, wherein the input data comprises information indicating sensor data indicative of the user input.

3. The method according to claim 1 further comprising:
    receiving a second user input;
    determining that the second user input indicates the pre-defined gesture; and
    causing modification of the input evaluation directive.

4. The method according to claim 3, wherein the second user input comprises second input data indicative of the second user input, and wherein causing modification to the input evaluation directive comprises modifying the input evaluation directive such that the second input data is converted to modified second input data that equates to the at least one pre-defined gesture.

5. The method according to claim 3, wherein causing modification of the input evaluation directive occurs prior to receiving operation information from a remote device.

6. The method according to claim 1, wherein the operation information further comprises at least one guidance directive, wherein the at least one guidance directive indicates a suggested type of pre-defined gesture to associate with the at least one operation.

7. The method according to claim 6, wherein associating the at least one pre-defined gesture with the at least one operation comprises associating the at least one pre-defined gesture with the at least one operation based at least in part on the guidance directive.

8. An apparatus comprising a processor and a memory including computer program code, the memory and the computer program code configured to, with the processor, cause the apparatus to:
receive operation information from a remote device, wherein the operation information indicates at least one operation that may be invoked by the remote device;
associate at least one pre-defined gesture with the at least one operation;
receive user input from a user, wherein the user input is defined by input data indicative of the user input;
apply an input evaluation directive to the input data to form modified user input data, wherein the input evaluation directive defines a conversion that is customized to the user;
determine that the modified user input corresponds to the at least one pre-defined gesture; and
cause transmission of indication information to the remote device, wherein the indication information provides an indication to the remote device to perform the at least one operation associated with the pre-defined gesture.

9. The apparatus of claim 8, wherein the input data comprises information indicating sensor data indicative of the user input.

10. The apparatus of claim 8, wherein the memory and the computer program code are further configured to, with the processor, cause the apparatus to:
receive a second user input;
determine that the second user input indicates the pre-defined gesture; and
cause modification of the input evaluation directive.

11. The apparatus of claim 10, wherein the second user input comprises second input data indicative of the second user input, and wherein the memory and the computer program code are further configured to, with the processor, cause the apparatus to cause modification to the input evaluation directive by modifying the input evaluation directive such that the second input data is converted to modified second input data that equates to the at least one pre-defined gesture.

12. The apparatus of claim 10, wherein the memory and the computer program code are further configured to, with the processor, cause the apparatus to cause modification of the input evaluation directive prior to receiving operation information from a remote device.

13. The apparatus of claim 8, wherein the operation information further comprises at least one guidance directive, wherein the at least one guidance directive indicates a suggested type of pre-defined gesture to associate with the at least one operation.

14. The apparatus of claim 13, wherein the memory and the computer program code are further configured to, with the processor, cause the apparatus to associate the at least one pre-defined gesture with the at least one operation by associating the at least one pre-defined gesture with the at least one operation based at least in part on the guidance directive.

15. Computer program product comprising a non-transitory computer readable medium having program code portions stored thereon, the program code portions being a computer readable medium and configured when said program product is run on a computer or network device, to:
receive operation information from a remote device, wherein the operation information indicates at least one operation that may be invoked by the remote device;
associate at least one pre-defined gesture with the at least one operation;
receive user input from a user, wherein the user input is defined by input data indicative of the user input;
apply an input evaluation directive to the input data to form modified user input data, wherein the input evaluation directive defines a conversion that is customized to the user;
determine that the modified user input corresponds to the at least one pre-defined gesture; and
cause transmission of indication information to the remote device, wherein the indication information provides an indication to the remote device to perform the at least one operation associated with the pre-defined gesture.

16. The computer program product of claim 15, wherein the input data comprises information indicating sensor data indicative of the user input.

17. The computer program product of claim 15, wherein the program code portions are further configured when said program product is run on a computer or network device, to:
receive a second user input;
determine that the second user input indicates the pre-defined gesture; and
cause modification of the input evaluation directive.

* * * * *